United States Patent
Schoenfelder et al.

(10) Patent No.: US 7,063,639 B2
(45) Date of Patent: Jun. 20, 2006

(54) SNOWMOBILE PLANETARY DRIVE SYSTEM

(75) Inventors: Raymond A. Schoenfelder, Zumbrota, MN (US); Dennis Zulawski, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/859,394

(22) Filed: Jun. 1, 2004

(65) Prior Publication Data

US 2004/0220013 A1 Nov. 4, 2004

Related U.S. Application Data

(60) Division of application No. 09/966,926, filed on Sep. 27, 2001, now Pat. No. 6,742,618, which is a continuation-in-part of application No. 09/843,587, filed on Apr. 26, 2001, which is a continuation-in-part of application No. 09/520,101, filed on Mar. 7, 2000, now abandoned.

(51) Int. Cl.
*F16H 3/44* (2006.01)
*B62D 55/00* (2006.01)
*B62D 55/12* (2006.01)
*B62M 27/02* (2006.01)
*B62M 29/00* (2006.01)

(52) U.S. Cl. ............ 475/286; 180/190; 180/9.64; 180/184; 180/9.21

(58) Field of Classification Search ........... 475/286, 475/317, 323; 180/182, 190, 9.1, 9.64, 184, 180/9.21

See application file for complete search history.

(56) References Cited

U.S. PATENT DOCUMENTS

| 1,370,378 A | | 3/1921 | Starr |
| 2,277,157 A | * | 3/1942 | Sneed .................. 477/121 |
| 2,707,522 A | | 5/1955 | Sibley |
| 2,892,365 A | * | 6/1959 | Winther ................ 475/276 |
| 3,347,113 A | * | 10/1967 | Ramsel .................. 475/55 |
| 3,521,718 A | | 7/1970 | Masaoka et al. |
| 3,529,494 A | | 9/1970 | Matte |
| 3,548,665 A | * | 12/1970 | Crooks .................. 74/15.63 |
| 3,698,497 A | | 10/1972 | Bombardier |
| 3,763,978 A | | 10/1973 | Crooks |
| 3,839,921 A | | 10/1974 | Haug |
| 3,884,097 A | * | 5/1975 | Avramidis et al. .......... 475/208 |
| 3,954,028 A | * | 5/1976 | Windish ................ 475/328 |
| 3,985,192 A | | 10/1976 | Samuelson et al. |
| 4,069,882 A | | 1/1978 | Leonard et al. |
| 4,212,111 A | | 7/1980 | Saari |

(Continued)

FOREIGN PATENT DOCUMENTS

CA 1012467 6/1977

(Continued)

OTHER PUBLICATIONS

Harris, R., "Drive Systems Industrial Revolution Black Diamond Moves to Eradicate Chaincases", *ModStock Competition*, vol. 27, No. 6, pp. 18-19, 46 (Fall 2000).

(Continued)

*Primary Examiner*—Tisha Lewis
(74) *Attorney, Agent, or Firm*—Black Lowe & Graham, PLLC

(57) ABSTRACT

Disclosed is a snowmobile including a reduction drive system including planetary gears. In an alternate embodiment, a reversing unit is provided. In a further alternate embodiment, an offset is provided in the drive system.

10 Claims, 19 Drawing Sheets

U.S. PATENT DOCUMENTS

| | | | |
|---|---|---|---|
| 4,290,320 A * | 9/1981 | Abbott ........................ 475/66 |
| 4,317,389 A | 3/1982 | Falzoni |
| 4,362,524 A | 12/1982 | Lob et al. |
| 4,497,218 A | 2/1985 | Zaunberger |
| 4,502,353 A | 3/1985 | Beaudoin |
| 4,528,870 A | 7/1985 | van Deursen et al. |
| 4,546,842 A | 10/1985 | Yasui |
| 4,602,525 A * | 7/1986 | Moroto et al. ............... 475/210 |
| 4,706,518 A * | 11/1987 | Moroto et al. ............... 475/210 |
| 4,718,508 A | 1/1988 | Tervola |
| 4,784,018 A | 11/1988 | Okada et al. |
| 4,893,687 A | 1/1990 | Simmons |
| 4,974,693 A | 12/1990 | Nakai et al. |
| 4,988,329 A | 1/1991 | Lammers |
| 5,004,060 A | 4/1991 | Barbagli et al. |
| 5,060,745 A | 10/1991 | Yasui et al. |
| 5,064,011 A | 11/1991 | Ogano et al. |
| 5,101,919 A | 4/1992 | Ossi |
| 5,141,477 A * | 8/1992 | Oshidari ..................... 475/330 |
| 5,152,725 A | 10/1992 | Shank, Jr. |
| 5,172,786 A | 12/1992 | Ishibashi et al. |
| 5,332,058 A | 7/1994 | Bianco |
| 5,390,347 A | 2/1995 | Buri et al. |
| 5,435,793 A | 7/1995 | Varela et al. |
| 5,467,597 A | 11/1995 | Forster |
| 5,584,161 A | 12/1996 | Zanini et al. |
| 5,605,518 A | 2/1997 | Kogure et al. |
| 5,607,026 A | 3/1997 | Rioux et al. |
| 5,624,340 A | 4/1997 | Forster |
| 5,680,715 A | 10/1997 | Thiboutot et al. |
| 5,685,387 A | 11/1997 | Rioux et al. |
| 5,803,858 A | 9/1998 | Haka |
| 5,833,566 A | 11/1998 | Showalter |
| 5,836,843 A | 11/1998 | Richards |
| 5,836,850 A * | 11/1998 | Raghavan et al. .......... 475/286 |
| 5,893,814 A * | 4/1999 | Kiyosawa ................... 475/325 |
| 5,916,053 A | 6/1999 | McCarrick et al. |
| 5,924,503 A | 7/1999 | Lykken |
| 5,928,099 A | 7/1999 | Tsunemi |
| 5,951,434 A | 9/1999 | Richards et al. |
| 5,954,612 A | 9/1999 | Baxter, Jr. |
| 5,967,936 A * | 10/1999 | Kim et al. ................... 475/287 |
| 5,980,414 A | 11/1999 | Larkin |
| 5,984,821 A | 11/1999 | Showalter |
| 5,992,552 A | 11/1999 | Eto |
| 5,997,429 A * | 12/1999 | Raghavan et al. .......... 475/280 |
| 6,007,450 A * | 12/1999 | Raghavan et al. .......... 475/286 |
| 6,070,683 A | 6/2000 | Izumi et al. |
| 6,086,504 A | 7/2000 | Illerhaus |
| 6,227,323 B1 | 5/2001 | Ashida |
| 6,306,057 B1 * | 10/2001 | Morisawa et al. .............. 475/5 |
| 6,530,855 B1 * | 3/2003 | Folsom et al. ................ 475/72 |
| 6,742,618 B1 | 6/2004 | Schoenfelder et al. |

FOREIGN PATENT DOCUMENTS

| | | |
|---|---|---|
| CA | 1073012 | 3/1980 |
| DE | 23 31 277 A1 | 1/1975 |
| DE | 41 04 487 A1 | 8/1991 |
| EP | 0 035 806 B1 | 9/1984 |
| EP | 0 208 288 A2 | 1/1987 |
| EP | 0 286 641 B1 | 5/1991 |
| EP | 0 553 746 A1 | 8/1993 |
| EP | 0 807 030 B1 | 3/1999 |
| FR | 2 599 699 A3 | 12/1987 |
| GB | 1 476 248 | 6/1977 |
| GB | 1 558 726 | 1/1980 |
| GB | 2 045 368 A | 10/1980 |
| GB | 2 051 265 A | 1/1981 |
| GB | 2 062 558 A | 5/1981 |
| GB | 2 156 475 A | 10/1985 |
| JP | 49-108470 | 10/1974 |
| JP | 51-106919 | 9/1976 |
| JP | 52-9229 | 1/1977 |
| JP | 56-42551 | 4/1981 |
| JP | 57-204362 | 12/1982 |
| JP | 60146941 A * | 8/1985 |
| JP | 60-249757 | 12/1985 |
| JP | 61-084454 | 4/1986 |
| JP | 61-132419 | 6/1986 |
| JP | 61-188283 | 8/1986 |
| JP | 61-192983 | 8/1986 |
| JP | 61-274158 | 12/1986 |
| JP | 63-143482 | 9/1988 |
| JP | 63-297177 | 12/1988 |
| JP | 64-28387 | 2/1989 |
| JP | 1-98084 | 4/1989 |
| JP | 1-122785 | 5/1989 |
| JP | 2-296590 | 12/1990 |
| JP | 3-85750 | 8/1991 |
| JP | 5-20918 | 1/1993 |
| JP | 6-117500 | 4/1994 |
| JP | 7-101364 | 4/1995 |
| JP | 8-324323 | 12/1996 |
| JP | 9-240525 | 9/1997 |
| JP | 10-81152 | 3/1998 |
| JP | 10-194169 | 7/1998 |
| JP | 10-203436 | 8/1998 |
| JP | 10-316008 | 12/1998 |
| JP | 10-316057 | 12/1998 |
| WO | WO 86/07423 | 12/1986 |

OTHER PUBLICATIONS

RMI Drive System:, *SnoWest*, vol. 28, No. 3, p. 14 (Mar. 2001).

* cited by examiner

US 7,063,639 B2

SNOWMOBILE PLANETARY DRIVE SYSTEM

CROSS REFERENCE TO RELATED APPLICATIONS

This application is a divisional of U.S. patent application Ser. No. 09/966,926 that was filed with the United States Patent and Trademark Office on Sep. 27, 2001, now U.S. Pat. No. 6,742,618, that is a continuation in part of U.S. patent application Ser. No. 09/843,587 that was filed with the United States Patent and Trademark Office on Apr. 26, 2001 that is a continuation in part of U.S. patent application Ser. No. 09/520,101 that was filed with the United States Patent and Trademark Office on Mar. 7, 2000, now abandoned. The entire disclosures of U.S. patent application Ser. Nos. 09/843,587, 09/520,101 and 09/966,926 are incorporated herein by reference.

FIELD OF THE INVENTION

The present invention relates to snowmobiles and more particularly to drive systems for snowmobiles. More particularly, the present invention relates to snowmobiles including various embodiments of drive systems utilizing planetary gears.

BACKGROUND OF THE INVENTION

Snowmobiles have been known for many years. Early snowmobiles were developed with an appearance that is very primitive compared to the snowmobile of today. The snowmobile of modem times is a sophisticated vehicle with heated handle bars, twin head lights, high powered engines and many other improvements not found in the original snowmobiles.

One of the weak points in snowmobiles has been the drive system. Snowmobile drive systems have generally included a chain rpm reduction drive. The rpm of the engine must be reduced prior to applying the rotational drive to the differential sprockets driving the track. In the past the drive system has included a chain and sprocket system. The chain and sprocket system tends to wear and is subject to extreme abuse in the activities of normal snowmobile use. The rapid starts and stops, the very high rpm torque when the snowmobile leaves the ground and leaps into the air results in extremely rapid changes of speed and load.

It is also sometimes desired to include in the drive system a reverse unit for propelling the snowmobile in reverse direction under power of the engine. Reverse units of snowmobiles to date have achieved only low to moderate effectiveness.

DETAILED DISCLOSURE

Figure 1:
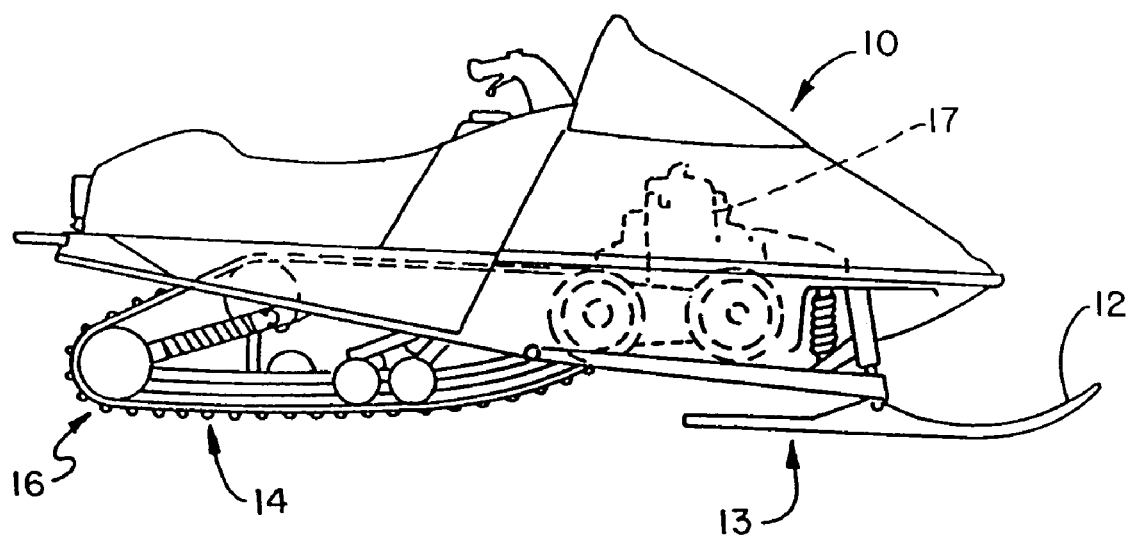
FIG. 1 shows a snowmobile of the present invention.

FIGS. 1–8 are the original figures from the parent application Ser. No. 09/520,101 that was filed with the United States Patent and Trademark Office on Mar. 7, 2000. Some changes have been made to FIGS. 1–8 for clarification purposes. FIGS. 9–15 are the figures added in the parent application Ser. No. 09/843,587 that was filed with the United States Patent and Trademark Office on Apr. 26, 2001.

The snowmobile 10 of the present invention (FIG. 1-5) includes a pair of skis 12, which support the forward portion 13 of the snowmobile 10. A continuous track 14 supports the rear portion 16 of the snowmobile 10. The snowmobile 10 has an engine 17 which is disposed in the forward portion 13.

The engine 17 rotatably drives a train 18 which in turns drives the endless track 14. The drive train 18 includes an engine drive shaft 15, primary clutch 18a, a drive belt 18b, a secondary clutch 18c and a reduction drive 19. The reduction drive 19 may include a drive shaft 21 that is rotatably driven by the secondary clutch 18c. The drive shaft 21 (FIGS. 4 & 5) carries a sun gear 22, which is integral with said shaft 21. Note that a "sun gear" is any gear that drives a plurality of planetary gears. Also note, that the "longitudinal axis" of a shaft is the axis along the length of such shaft. The shaft 21 is rotatably supported in suitable bearings or bushings. Such bearings or bushings may be roller bearings. The embodiment shown in the figures depicts the use of single row ball bearings 23 and 24.

The reduction drive 19 further includes a plurality of planetary gears 26, 27, 28, and 29. The reduction drive 19 is shown having four planetary gears 26–29, however, the reduction drive may have any desired number of such gears, e.g., three. The planetary gears 26–29 are supported between a pair of planetary gear plates 31,32. The plates 31, 32 carry a plurality of shafts 36, 37, 38 and 39 which rotatably support the gears 26–29 respectively. The shafts 36–39 may be integrally secured to the plates 31, 32, which in turn serve to maintain said gears 26–29 in spaced relationship around the sun gear. Spacers 30 may retain plates 31, 32 in proper spaced relationship. The shafts 36–39 are secured in the openings 36a–39a, respectively.

The reduction drive 19 includes a second shaft 43 which is integral with the plates 31, 32. In other words shaft 43 is locked by a key in the hub 31a.

The reduction drive 19 has a housing 40 including first housing member 41 and a second housing member 42. A ring gear 44 is integrally mounted in the second housing member 41. The ring gear 44 engages the planetary gears 26–29. The second shaft 43 is integral, e.g., in locked driving engagement, with the plates 31, 32 and is driven by planetary gears 26–29. The second shaft 43 serves to drive the endless track 14 through sprocket 51.

The sun gear 22, planetary gears 26–29 and ring gear 44 are contained in housing 40 including first housing member 41 and second housing member 42. The housing members 41 and 42 may be held together by suitable screws 45.

The operation of the present invention is apparent from the description of the snowmobile 10, however in order to provide a more complete understanding of the 20 present invention the operation will be further described. The engine 17 may be a conventional gasoline powered engine of the type generally found in snowmobiles. However, the engine 17 may be any other type of engine suitable for driving a snowmobile. The engine 17 rotatably drives the primary clutch 18a which in turn drives the belt 18b. The drive belt 18b may drive the secondary clutch 18c which rotatably drives the shaft 21. The sun gear 22 is then driven by the shaft 21. The sun gear 22 engages the planetary gears 26–29 which are rotatably supported in the plates 31, 32. The force of the sun gear 22 acting on the planetary gears 26–29 cause the gears 26–29 to rotate and move along the ring gear 44 thereby rotating the plates 31, 32. The rotation of plates 31, 32 rotatably drives the second shaft 43. The second shaft 43 rotates at an rpm lower than the rotation of the first shaft 21 resulting in a gear reduction. The second shaft 43 in turn drives a sprocket 51 acting on the endless track 14, thereby driving such track.

AN ALTERNATIVE EMBODIMENT OF THE PRESENT INVENTION

A further embodiment of the present invention snowmobile 110 (FIG. 6-8) includes a pair of skis 112 which support the forward portion 113 of the snowmobile 110. A continuous track 114 supports the rear portion 116 of the snowmobile 110. The snowmobile 110 has an engine 117 which is disposed in the forward portion 113.

The engine 117 rotatably drives a power train 118 which in turns drives the endless track 114. The drive train 118 includes a planetary reduction gear system 119, which in turn drives a primary clutch 121, a drive belt 122, and a secondary clutch 123. The planetary reduction drive system 119 may be mounted on the drive shaft 124 of the engine 117. The planetary reduction drive system 119 may be similar in structure to planetary reduction drive system 19 shown in FIGS. 4 and 5. The planetary reduction drive system 119 is rotatably driven by the engine drive shaft 124. The engine drive shaft 124 (FIGS. 7 & 8) drives a drive shaft 127 (also may be referred to as an input shaft) that carries a sun gear 126 that is integral with the engine drive shaft 124. The engine drive shaft 124 may be rotatably supported in suitable bearings or bushings. Such bearings or bushings may be roller bearings. The embodiment shown in the figures depicts the use of single row ball bearing 125.

The reduction drive system 119 further includes a plurality of planetary gears 131. The planetary gears 131 are supported between a pair of planetary gear plates 136, 137. The plates 136, 137 carry a plurality of shafts 141 which rotatably support the gears 131 respectively. The shafts 141 may be integrally secured to the plates 136, 137, which in turn serve to maintain said gears 131–134 in spaced relationship around the sun gear 126. A plurality of spacers 138 may retain plates 136, 137 in proper spaced relationship such that the planetary gears 131 may freely rotate there between. The spacers 138 may be integral with respect to plates 136, 137.

The reduction drive 119 includes a second shaft 145 which is integral with respect to the plates 136, 137. Second shaft 145 is tapered to fit the primary clutch 121. Of course any shape second shaft that is capable of driving the primary clutch is within the scope of the present invention.

The reduction drive 119 has a first housing member 151 and a second housing member 152. A ring gear 154 is integrally mounted in the second housing member 152. The ring gear 154 engages the planetary gears 131. The second shaft 145 is integral, e.g., in locked driving engagement, with the plates 136, 137 and is driven by planetary gears 131. The second shaft 145 serves to drive the primary clutch 121.

The sun gear 126, planetary gears 131 and ring gear 154 are contained in housing 150 including first housing member 151 and second housing member 152. The housing members 151 and 152 may be held together by suitable screws (not shown).

The operation of the present invention including the reduced rpm clutch is apparent from the description of the snowmobile 110. The engine 117 may be a conventional gasoline powered engine. The engine 117 has an engine drive shaft 124, which drives a sun gear 126, which in turn drives a plurality of planetary gears 131. The sun gear 126 engages the planetary gears 131 which are rotatably supported in the plates 136, 137. The force of the sun gear 126 acting on the planetary gears 131 cause the gears 131 to rotate and move along the ring gear 154 thereby rotating the plates 136, 137. The rotation of plates 136, 137 rotatably drives the second shaft 145. The second shaft 145 rotates at an rpm lower than the rotation of the drive shaft 124 resulting in a gear reduction. The second shaft 145 rotatably drives the primary clutch 121 which in turn drives the belt 122. The drive belt 122 drives the secondary clutch 123. Clutch 123 rotatably drives the shaft 157 which carries sprocket drives 158 and 159. The sprockets 158, 159 drive the track 114.

Figure 9:
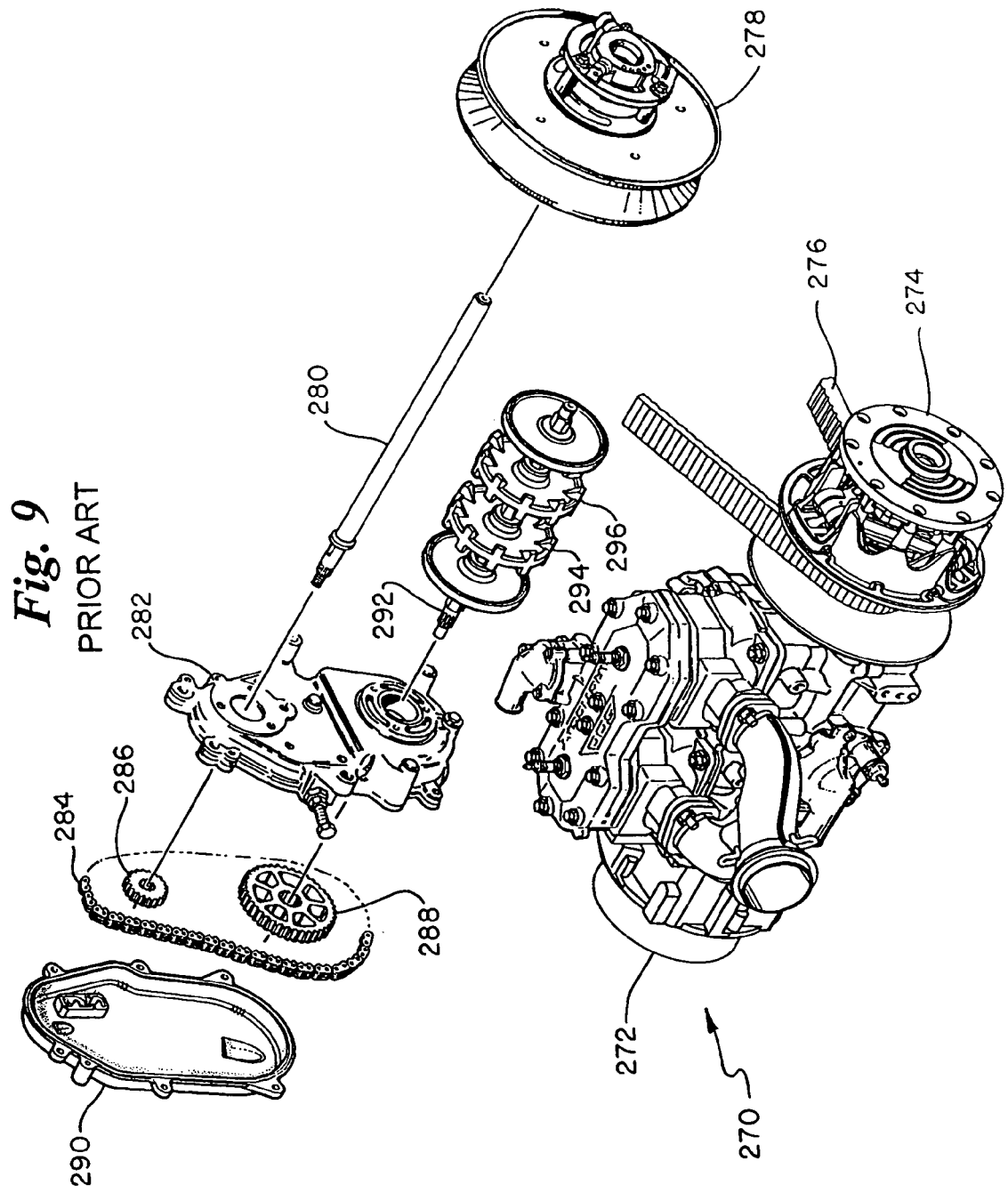
FIG. 9 shows an exploded perspective view of a prior art drive train.
Figure 10:
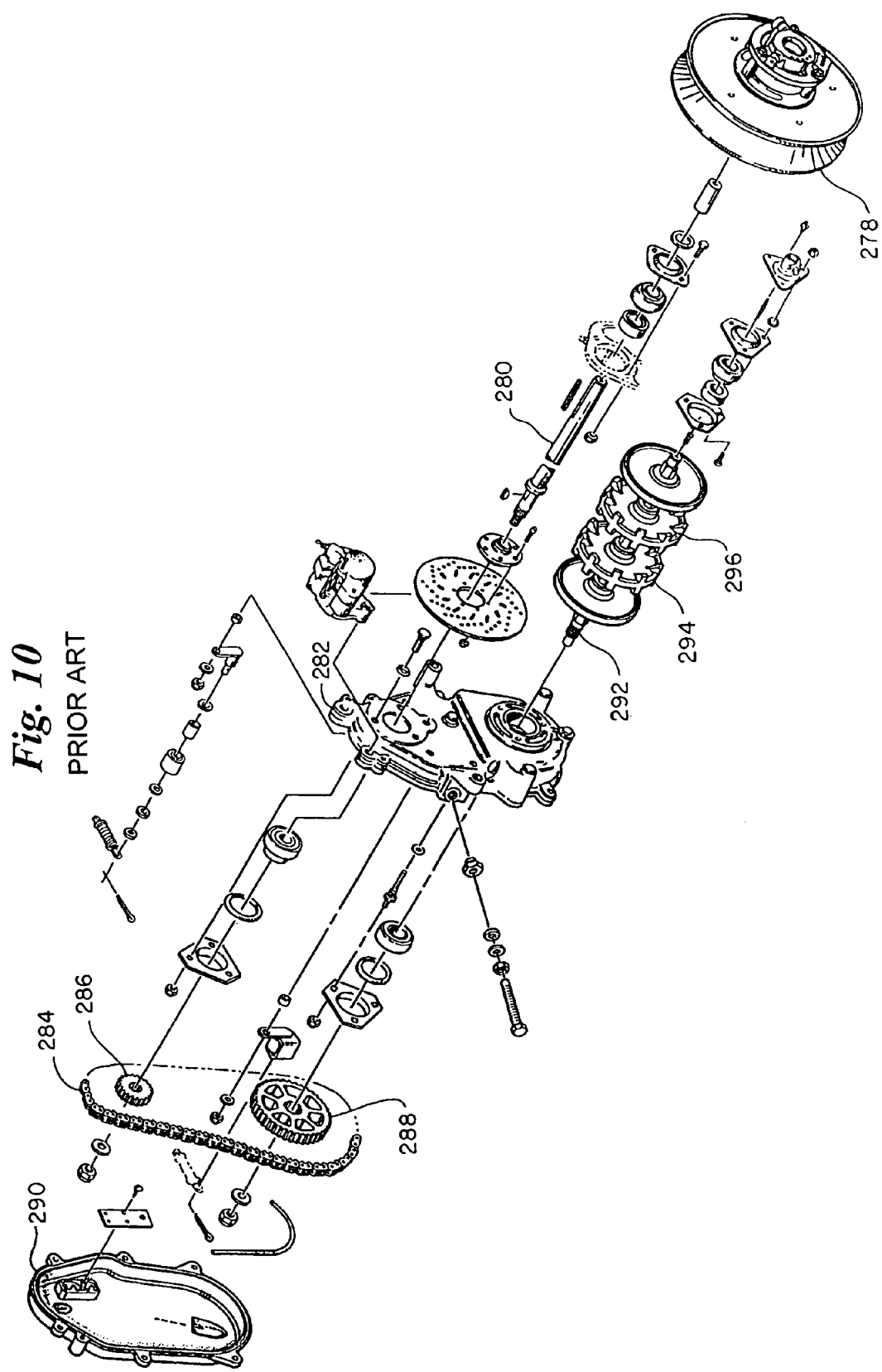
FIG. 10 shows an exploded perspective view of a portion of the prior art drive train.
Figure 11:
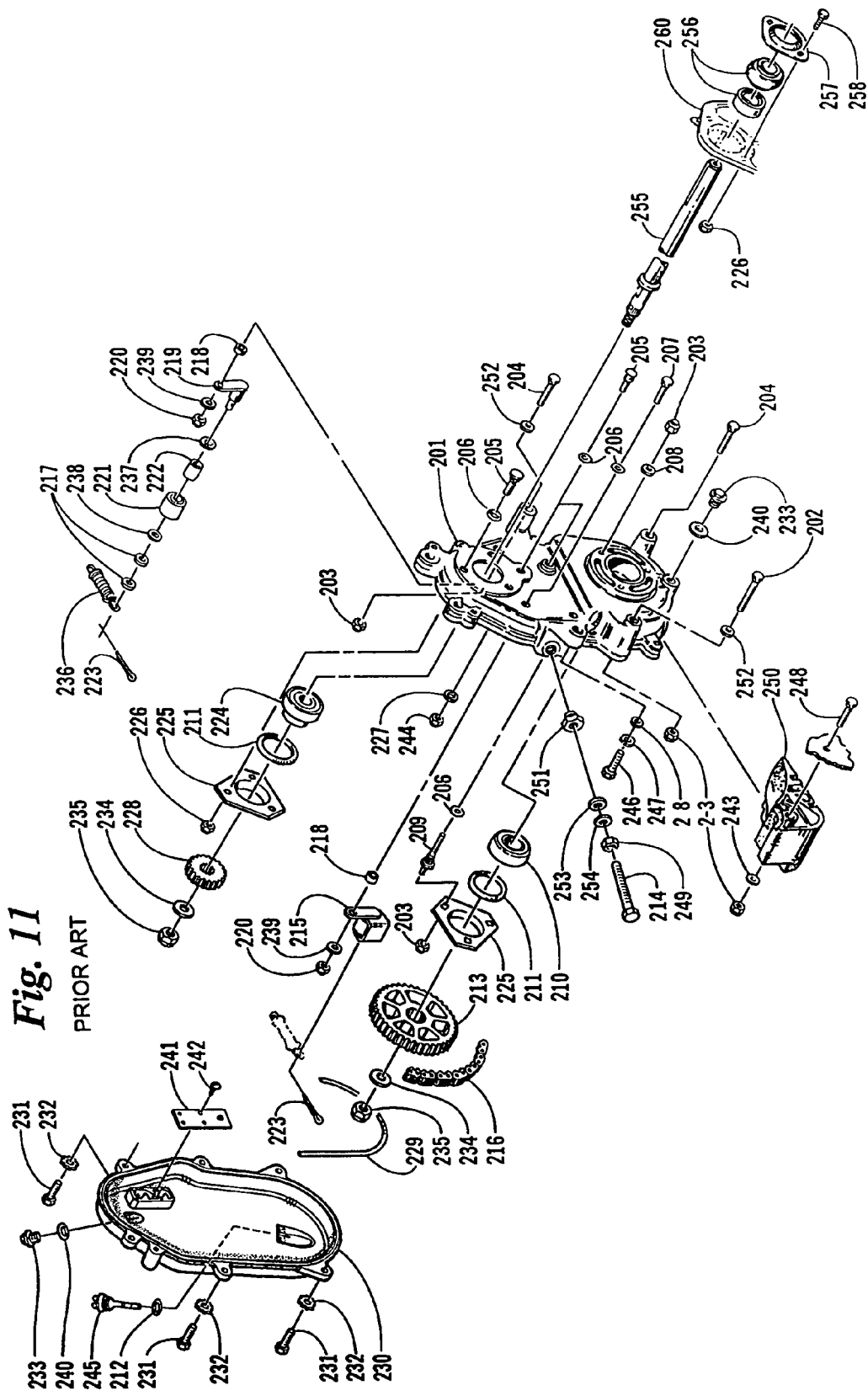
FIG. 11 shows an exploded perspective view of the parts of a prior art drive train that are eliminated by one embodiment of the present invention.

Turning now to FIGS. 9–11, a conventional prior art snowmobile drive system is shown. FIG. 9 is an exploded perspective view of the major components of a prior art drive system including the engine. FIG. 10 is an exploded perspective view of the portion of a prior art drive system from the secondary clutch to the track drive sprockets. FIG. 11 is an exploded perspective view of the parts of the conventional prior art drive system of FIG. 10 that may be eliminated by one embodiment of the present invention.

The major components of the prior art drive system 270 shown in FIG. 9 are engine 272, primary clutch 274, engine drive shaft (not shown) connecting the engine 272 to the primary clutch 274, drive belt 276 (shown in partial cutaway view), secondary clutch 278, driven shaft 280, dropcase 282, drive chain 284, top drive sprocket 286, bottom drive sprocket 288, dropcase cover 290, shaft 292 and track drive sprockets 294 and 296.

FIG. 10 includes the major components from the secondary clutch 278 to the track drive sprockets 294 and 296 as well as additional components of the conventional prior art drive train system 270.

The parts of a chain and sprocket rpm reduction drive of the prior art are subject to wear and tear and tend to require high maintenance. Furthermore, the use of a chain and sprocket reduction drive requires that the drive system, including the engine drive shaft, have three parallel shafts. For each shaft there must be associated bearings and other support parts associated therewith. The present invention advantageously eliminates one of the three shafts, in addition to the elimination of the chain and sprocket rpm reduction drive.

Transmission of power through a rotating shaft results in shaft wind-up. Shaft wind-up is essentially a lag in the power transmission through the shaft. The amount of wind-up is dependent on the shaft material as well as the shaft length. This lag in power transmission introduces inefficiencies and power loss into the drive train. Therefore, the elimination of the third shaft by use of a planetary reduction drive provides a further significant advantage of reducing total wind-up in the system.

The elimination of the third shaft, along with elimination of many associated parts, results in a significant weight reduction in the drive train. FIG. 11 is an exploded perspective view of the parts of the conventional prior art drive system of FIG. 10 that may be eliminated by one embodiment of the present invention, specifically the embodiment shown in FIG. 13. The reference numbers shown in FIG. 11 are listed in the below table, with associated part numbers, quantity that can be eliminated by the FIG. 13 embodiment of the present invention, part description and weight in pounds.

| REF # in FIG. 11 | PART NO. | QTY | DESCRIPTION | WEIGHT |
| --- | --- | --- | --- | --- |
| 201 | 0702-375 | 1 | DROPCASE W/ STUDS | 3.974 |
| 202 | 8011-143 | 1 | BOLT, CARRIAGE | 0.038 |
| 203 | 8040-426 | 10 | NUT, LOCK | 0.112 |
| 204 | 8011-139 | 2 | BOLT, CARRIAGE | 0.110 |
| 205 | 0123-523 | 4 | BOLT, RIBBED | 0.011 |
| 206 | 0607-025 | 9 | O-RING STUD | 0.010 |
| 207 | 0623-117 | 2 | BOLT, RIBBED | 0.069 |
| 208 | 8050-247 | 6 | WASHER | 0.012 |
| 209 | 0623-317 | 3 | STUD | 0.138 |
| 210 | 1602-051 | 1 | BEARING, 1 IN | .320 |
| 211 | 1670-237 | 2 | SEAL, O-RING | 0.004 |
| 212 | 0670-183 | 1 | O-RING, OIL LEVEL STICK | 0.001 |
| 213 | 1602-087 | 1 | SPROCKET 39T | 2.036 |
| 214 | 1602-101 | 1 | ADJUSTER, CHAIN | 0.068 |
| 215 | 0702-324 | 1 | ARM, TIGHTENER-ASSY | 0.496 |
| 216 | 1602-041 | 1 | CHAIN, 70P | 1.635 |
| 217 | 8050-212 | 2 | WASHER | 0.002 |
| 218 | 0602-369 | 2 | BUSHING, TIGHTENER ARM | 0.004 |
| 219 | 0702-115 | 1 | ARM, TIGHTENER | .310 |
| 220 | 0623-122 | 2 | NUT, LOCK | 0.021 |
| 221 | 0702-129 | 1 | ROLLER, TIGHTENER (INC. 22) | .398 |
| 222 | 0602-383 | 1 | BEARING, CHAIN TIGHTENER | .215 |
| 223 | 0123-082 | 2 | PIN, COTTER | — |
| 224 | 1602-052 | 1 | BEARING, 7/8 IN | 0.332 |
| 225 | 0602-198 | 2 | PLATE, FLANGE | 0.136 |
| 226 | 8041-426 | | NUT, LOCK | 0.021 |
| 227 | 0623-094 | 2 | WASHER | 0.002 |
| 228 | 0602-456 | 11 | SPROCKET, 20T | 0.452 |
| 229 | 0602-437 | 1 | SEAL, DROPCASE | 0.021 |
| 230 | 0602-989 | 1 | COVER, DROPCASE | 1.985 |

| REF | PART NO. | QTY | DESCRIPTION | WEIGHT |
| --- | --- | --- | --- | --- |
| 231 | 8002-134 | 6 | SCREW, CAP | 0.186 |
| 232 | 8053-242 | 6 | WASHER, LOCK - EXTERNAL TOOTH | 0.006 |
| 233 | 0623-293 | 2 | PLUG, DROPCASE | 0.096 |
| 234 | 0623-231 | 2 | WASHER, SPRING | 0.090 |
| 235 | 0623-465 | 2 | NUT, LOCK | 0.082 |
| 236 | 0702-130 | 1 | SPRING ASSEMBLY | .090 |
| 237 | 0623-283 | 1 | WASHER | 0.008 |
| 238 | 0623-284 | 1 | WASHER | 0.008 |
| 239 | 8050-217 | 2 | WASHER | 0.008 |
| 240 | 0123-641 | 2 | WASHER, FIBER | 0.002 |
| 241 | 1602-152 | 1 | COVER, OIL VENT | 0.033 |
| 242 | 0623-081 | 4 | SCREW, SELF-TAPPING | 0.008 |
| 243 | 8050-242 | 1 | WASHER | 0.008 |
| 244 | 8042-426 | 1 | NUT | 0.016 |
| 245 | 0602-462 | 1 | STICK, OIL LEVEL | 0.015 |
| 246 | 8002-135 | 1 | SCREW, CAP | 0.038 |
| 247 | 8051-242 | 1 | WASHER, LOCK | 0.008 |
| 248 | 8011-137 | 1 | BOLT, CARRIAGE | 0.038 |
| 249 | 0123-150 | 1 | NUT | 0.016 |
| 250 | 0616-964 | 1 | GUARD, DROPCASE | .520 |
| 251 | 0602-876 | 1 | ADAPTER, MANUAL ADJUST | .102 |
| 252 | 8050-252 | AR | WASHER | 0.008 |
| 253 | 0623-905 | 1 | SEAL, MANUAL ADJUST | .008 |
| 254 | 8050-272 | 1 | WASHER | 0.008 |
| 255 | 0702-266 | 1 | SHAFT, DRIVEN | 5.589 |
| 256 | 1602-099 | 1 | BEARING, 1 IN (W/ LOCK COLLAR) | 0.399 |
| 257 | 0602-892 | 1 | PLATE, FLANGE | 0.136 |
| 258 | 8002-130 | 2 | SCREW, CAP | 0.044 |
| | | | TOTAL | 20.492 LBS. |

While the above table is provided for purposes of demonstrating the advantage of the current invention, it is important to keep in mind that the exact parts utilized in the present invention will vary within the scope of the invention and should not be limited by this table. Use in the present invention, of one or more of the parts listed in this table and shown in FIG. 11 does not bring a device outside the scope of the present invention.

ANOTHER ALTERNATIVE EMBODIMENT OF THE PRESENT INVENTION

Figure 12:
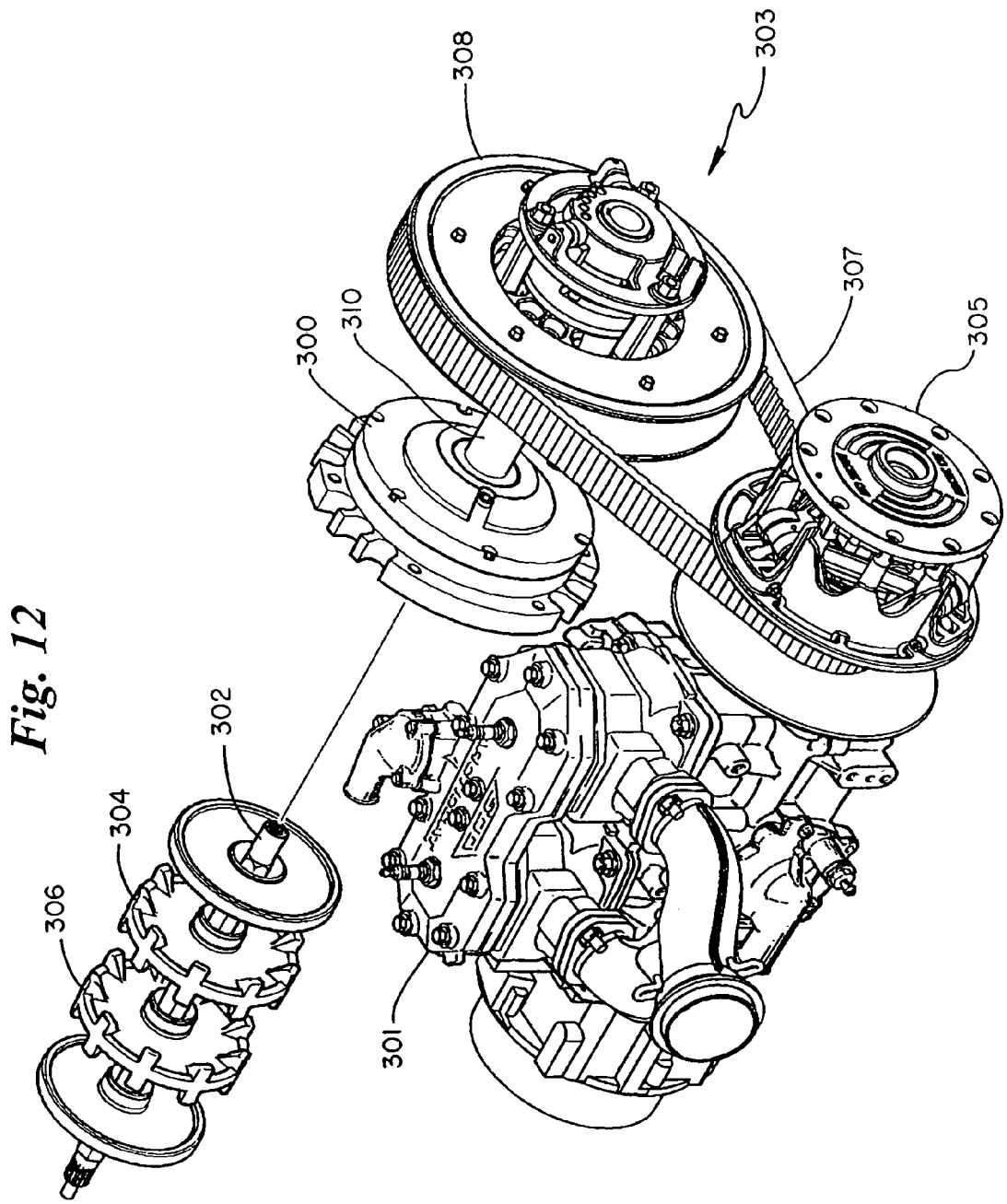
FIG. 12 is a perspective view of a engine and drive train according to an alternative embodiment of the present invention.

A further embodiment of a drive train according to the principles of the present invention is shown in FIGS. 12–15. FIG. 12 is a perspective view of an engine 301 and a drive train 303 according to the principles of the present invention. The drive train 303 includes one embodiment of a continuously variable transmission, specifically, a primary clutch 305 that is driven by the engine drive shaft (not shown), a drive belt 307 and a secondary clutch 308 driven by the drive belt 307. The drive train 303 further includes a planetary gear system 300 including drive shaft 310, track shaft 302, sprockets 304 and 306 and secondary clutch 308 arranged along a center axis.

Figure 14:
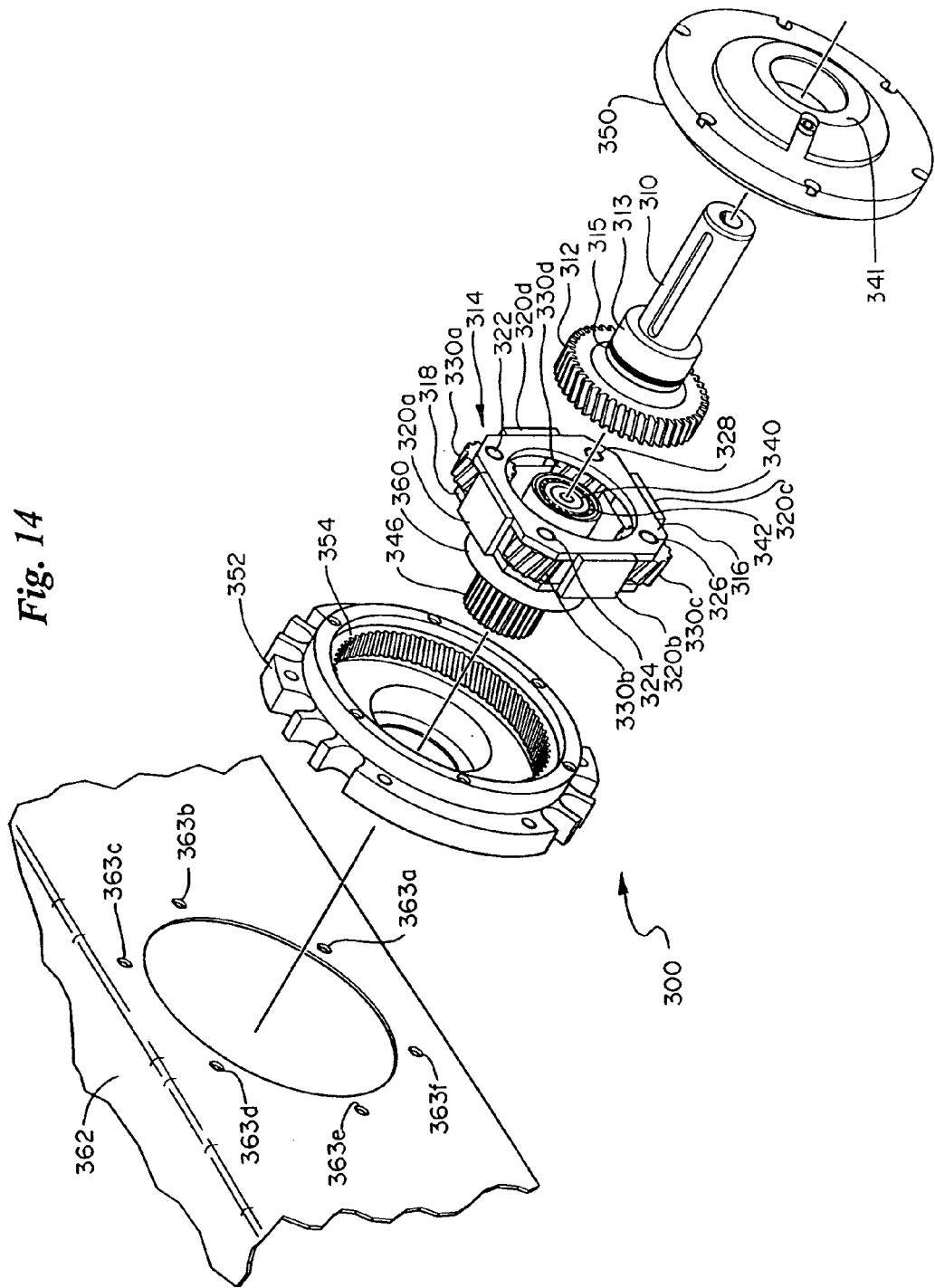
FIG. 14 is an exploded view of a further alternative embodiment of a planetary gear system of the present invention.
Figure 15:
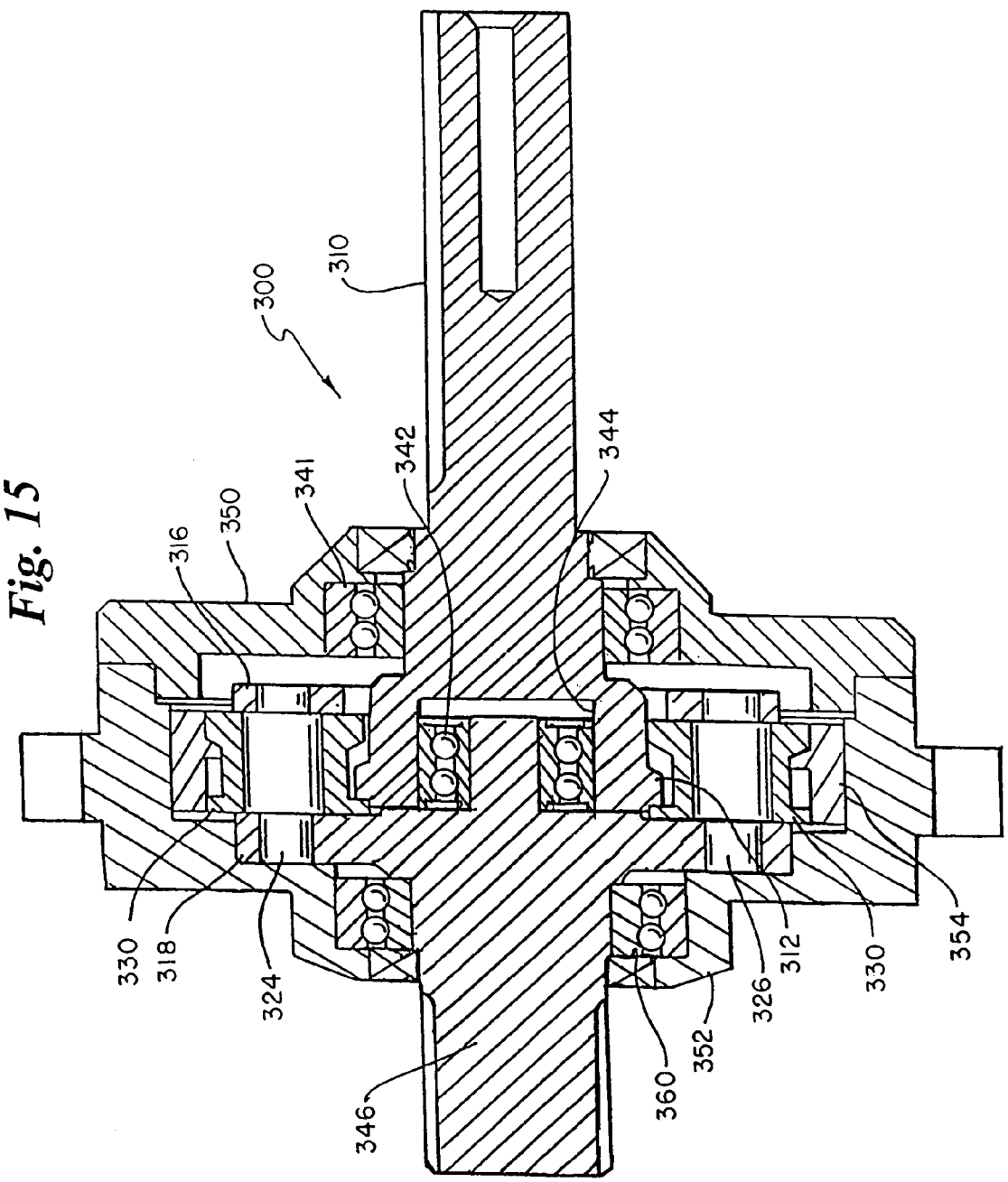
FIG. 15 is a sectional view of the planetary gear system shown in FIGS. 12, 13 and 14.

FIG. 14 is an exploded view of one embodiment of a planetary gear system 300 arranged along a center axis. FIG. 15 is a sectional view of the planetary gear system 300.

It is important to note that a planetary gear system according to the present invention may be any gear reduction system that utilizes a plurality of planetary gears, a sun gear and a ring gear to realize an rpm reduction. A planetary gear system may utilize a stationary ring gear resulting in rotation of the cage holding the planetary gears. Alternatively, it is also within the scope of the present invention that the planetary gear system utilize a stationary cage resulting in a rotating ring gear.

A planetary gear system of the present invention including the embodiment shown in FIG. 14 may be utilized either on the same longitudinal axis of the engine drive shaft or the longitudinal axis of the secondary clutch. Each of these locations of a planetary gear system is disclosed above. The embodiment of a planetary gear system 300 shown in FIGS. 12–15 may also be utilized in either of these locations. For sake of brevity, the placement of the planetary gear system 300 is only shown and described in the position on the longitudinal axis of the track shaft. However, the invention certainly contemplates the positioning of the planetary gear system 300 on the longitudinal axis of the engine drive shaft as would be well understood by one of skill in the art when considered with the disclosure set forth above and throughout this specification.

Turning first to the planetary gear system 300 shown in FIGS. 14 and 15, the input shaft 310 (also referred to as a drive shaft or first shaft) is coupled to and is driven by the secondary clutch 308 shown in FIG. 10. An input shaft is any shaft capable of transmitting rotational energy along its length. An input shaft can come in many different configurations. One embodiment of an input shaft is input shaft 310. The input shaft 310 is integrally part of the sun gear 312. However, the input shaft of this invention is not required to be integral with the sun gear. The input shaft 310 includes a larger diameter section 313 that sealingly fits within a roller bearing 341 in the first housing member 350. The seal between the input shaft 310 and the first housing member is provided by a grease seal 315. The input shaft 310 is rotatably supported by one or more elements. One example of such elements is a bearing or bushing. The embodiment shown in the figure shows the use of roller bearings, and more specifically, double row ball bearings 341 and 342.

A planetary gear system may include a planetary cage assembly. A planetary cage assembly is a plurality of planetary gears and a cage or other member that supports the plurality of planetary gears. One embodiment of a planetary cage assembly is planetary cage assembly 314. Planetary cage assembly 314 includes a cage including a pair of planetary gear plates 316 and 318 held together by spacer's 320a–d. The plates 316 and 318 carry a plurality of shafts 322, 324 326 and 328 that rotatably support the planetary gears 330a–d, respectively. The shafts 322, 324, 326.and 328 may be integrally secured to the plates 316 and 318, which in turn serve to maintain the planetary gears 330a–d in spaced relationship around the sun gear 312. Spacer's 320a–d may retain plates 316 and 318 in proper spaced relationship.

The planetary cage assembly 314 includes a weight bearing protrusion 340 and a bearing or bushing positioned around the weight-bearing protrusion 340. One embodiment of the bearing is double row ball bearing 342. A weight bearing protrusion is a protrusion or other profile that is capable of structurally supporting the weight of the sun gear. The weight bearing protrusion 340, along with the double row ball bearing 342, are sized to fit within an opening 344 (see FIG. 15) in the end of the integral member comprising the input shaft 310 and sun gear 312. The weight-bearing protrusion 340 therefore supports the weight of the sun gear 312 and input shaft 310.

A second shaft of a planetary gear system is any member coupled to one of the ring gear and planetary cage assembly wherein such member is capable of acquiring at least a portion of the rotational energy of the one of the ring gear and planetary cage assembly that rotates. A second shaft may be integral with or connected to the planetary cage assembly or alternatively integral with or connected to the ring gear. One embodiment of a second shaft of a planetary gear system is second shaft 346. Second shaft 346 is connected to plates 316 and 318 such that rotation of the plates 316 and 318 results in rotation of the second shaft 346. In the embodiment shown in FIG. 14, the second shaft 346 is a male-type splined member. It is certainly within the scope of this invention to have a second shaft having a female fitting or some other structure for connecting to whatever member the second shaft is driving.

Planetary gear system 300 further includes a housing 349, including first housing member 350 and a second housing member 352. The housing members 350 and 352 may be held together by suitable screws (not shown).

Double row ball bearing 360 provides bearing support of the planetary cage assembly 314 by the second housing member 352.

A ring gear 354 is mounted in the second housing member 352. The ring gear 354 engages the planetary gears 330a–d. As different size ring gears may be desired, the ring gear 354 may be removed from the second housing member 352 and replaced with a ring gear having a different diameter or different size gear teeth. The sun gear, planetary gears and the ring gear may be cast of high carbon steel.

The sun gear 312, planetary cage assembly 314 and ring gear 354 are contained in housing 349, including first housing member 350 and second housing member 352. The housing 349 is sealed and contains lubricating oil. The lubricating oil is anything that reduces the wear on the sun gear 312, planetary gears 330a–d, and ring gear 354. In one embodiment the oil used in the housing 349 is synthetic gear lube or alternatively synthetic transmission fluid.

In preferred embodiments of the planetary gear system of the invention, the gear reduction ratio ranges from about 6:1 to 1:1. This is contrasted with the conventional chain and sprocket reduction ratio range of from 1.6:1 to 2:1. The conventional chain and sprocket ratio range is limited by the diameter of the sprockets and the strength of the smaller drive sprocket.

Figure 13:
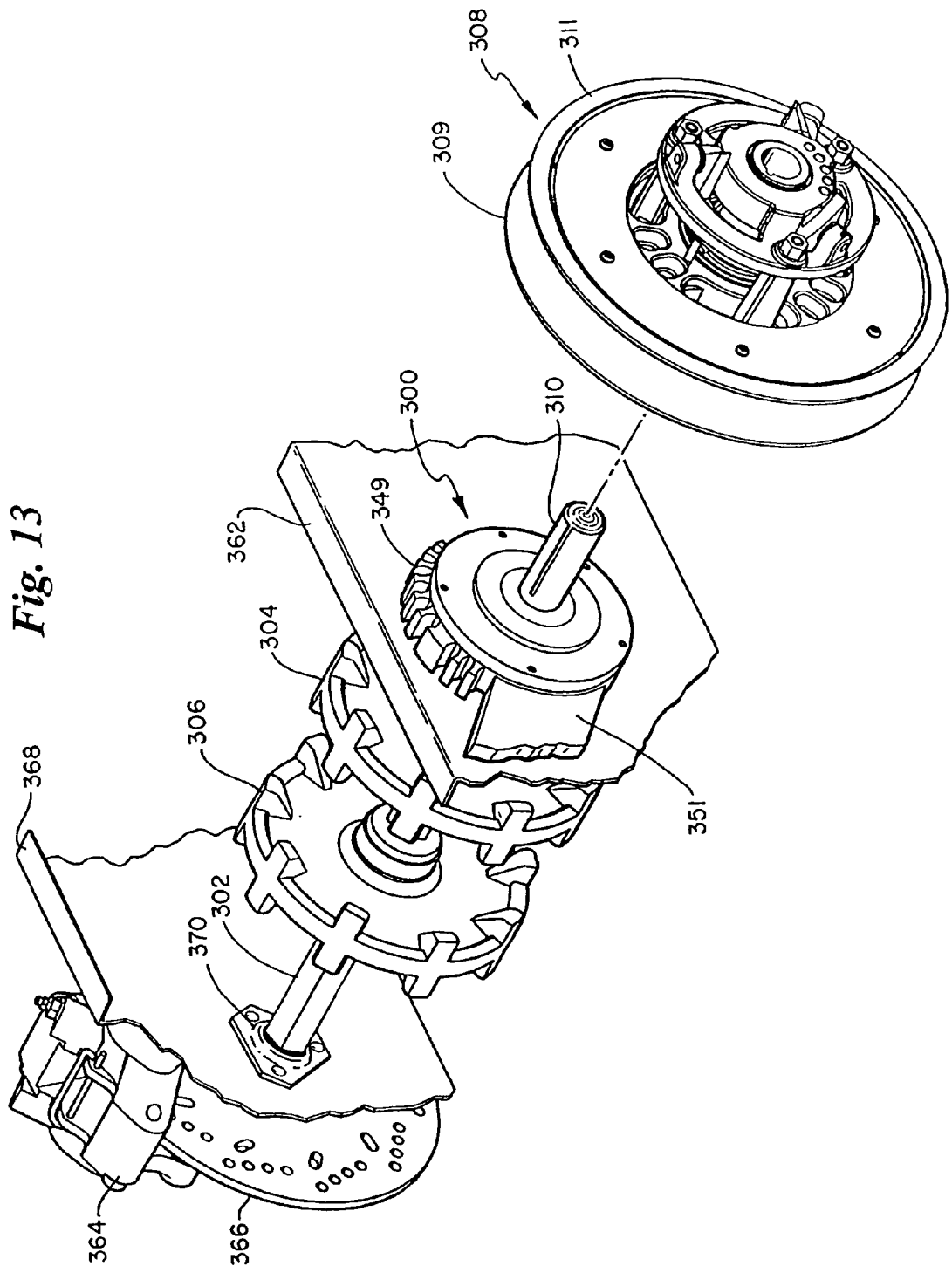
FIG. 13 is a portion of an alternative embodiment of a portion of drive train of the present invention.

Now turning to one embodiment placement of the planetary gear system 300 within the drive train 303, we turn our attention to FIG. 13. FIG. 13 is a perspective view of a portion of the drive train 303 shown in FIG. 14. FIG. 13 includes some additional components not shown in FIG. 14, such as the right chassis 362, left chassis 368, and stiffener 351. In the embodiment shown in FIG. 13, the planetary gear system 300 is mounted coaxial with the track shaft 302. The input 310 is driven, through keyed connection, by the secondary clutch 308 of a continuously variable transmission. The second or output shaft 346 of the planetary gear system 300 is coupled to and drives the track shaft 302. It is certainly within the scope of this invention for the track shaft 302 and second shaft 346 to be an integral or one-piece member.

In the embodiment of the drive train of the present invention shown in FIG. 13, the planetary gear system 300 is positioned adjacent to the outside of left chassis 362. It may be desirable to attach the housing 349 to the left chassis 362 with bolts (not shown) through holes in the left chassis 362 such as holes 363a–e. The planetary gear system 300 is supported by a stiffener or bracket 351 that has one end attached to the housing 349 of the planetary gear system 300 as shown, and the opposite end (not shown) secured to an engine mount (not shown).

The drive train of the present invention includes a track drive sprocket, alternatively referred to as a drive sprocket or simply as a sprocket. A sprocket is any member attached to a track shaft and engaged with a continuous drive track such that rotation of the track shaft causes rotation of the sprocket that causes rotation of the continuous drive track. The sprockets 304 and 306 are one well-known embodiment of a sprocket.

A conventional brake caliper 364 and disk 366 are mounted on the track shaft 302 to the outside of the right chassis 368. Alternatively, the brake caliper and disk may be located to the inside of the right chassis 368.

A bracket 370 containing a ring bearing (not shown) is secured to the right chassis 368 and further supports the track shaft 302.

A continuously variable transmission is any mechanism or system that provides variable gear reduction. One embodiment of a continuously variable transmission is referred to as a reduced rpm clutch or alternatively a clutch system. One embodiment of a continuously variable transmission or clutch system is a primary clutch (alternatively referred to as a drive clutch), a belt and a secondary clutch (alternatively referred to as a driven clutch), wherein the secondary clutch is driven by and connected to the primary clutch through the belt. This type of continuously variable transmission is well known.

One embodiment of the present invention utilizes a secondary clutch that has a smaller diameter than the prior art secondary clutch. Conventional secondary clutches typically have a diameter of about 10.5 to 11.7 inches. One embodiment of the present invention utilizes a secondary clutch having a diameter between 8 inches and 9.5 inches. The embodiment of the secondary clutch shown in FIGS. 12 and 13, namely secondary clutch 308 has a diameter of 8.6 inches. This diameter is measured from the outer edge of sheaves 309 and 311.

Significant advantages result from the use of a smaller diameter secondary clutch. For example, the smaller diameter secondary clutch results in less overall mass as well as less rotating mass. Furthermore, the smaller secondary clutch is more compact. Furthermore, as is discussed in more detail below, the smaller secondary clutch allows for a wider range of rpm reduction ratios.

The advantage of a more compact secondary clutch such as secondary clutch 308 is now further described. The present invention may result in placement of the secondary clutch on the same axis as the track shaft. A consequence of this placement is that a larger diameter or conventional secondary clutch is likely to strike the ground or snow in certain snowmobile driving circumstances. Therefore, a smaller diameter secondary clutch has the advantage of being able to place such clutch on the axis of the track shaft and yet maintain proper ground clearance. The only alternative to the smaller diameter secondary clutch would be to raise the track shaft. However, a lower track shaft translates into a desirable lower center of gravity for the snowmobile. It may also be desirable to configure the continuous track in a particular path that requires the track shaft and sprockets to be positioned in a lower position.

As mentioned above, a further advantage of the smaller diameter secondary clutch is the resulting wider range of rpm reduction ratios. The 8.6 inch diameter secondary clutch with a standard 8 inch diameter primary clutch yields a start-up ratio (when the snowmobile is going from being stationary to moving) of 2.77:1. The full ratio (when the snowmobile is moving) is 2.04:1. This yields an overall ratio of the continuously variable transmission of 5.65:1. A conventional continuously variable transmission with the larger 10.5 inch diameter secondary clutch and an 8 inch diameter primary clutch yields a start-up ratio of 3.44:1 and a full ratio of between 1:1 and 1.21:1. Therefore, at best, the conventional overall ratio of the continuously variable transmission is 4.16:1. This ratio change from 4.16:1 to 5.65:1 is a 36% increase in ratio range. The 36% increase in ratio range results in a better ability for the snowmobile to take-off from starting position to a moving position with reduced jerkiness that is caused by the initial engagement of the transmission.

The operation of the embodiment drive train partially shown in FIGS. 12–15, including the continuously variable transmission is here provided. The engine 301 may be a conventional gasoline powered engine of the type generally found in snowmobiles. However, the engine may be any other type of engine suitable for driving a snowmobile. The engine drive shaft (not shown in FIG. 12, but for example a shaft such as shaft 15 in FIGS. 2 and 3) rotatably drives the primary clutch 305 that in turn drives the belt 307. The drive belt drives the secondary clutch 308 that rotatably drives the input shaft 310. The sun gear 312 is then driven by the input shaft 310. The sun gear 312 engages the planetary gears 330a–d, which are rotatably supported, in the plates 316, 318. The force of the sun gear 312 acting on the planetary gears 330a–d cause the gears 330a–d to rotate and move along the ring gear 354 thereby rotating the plates 316, 318. The rotation of plates 316, 318 rotatably drives the second shaft 346. The second shaft 346 rotates at an rpm lower than the rotation of the input shaft 310 resulting in a gear reduction. The second shaft 346 in turn drives sprockets 304 and 306 that in turn engage and drive the endless track (such as endless or continuous track 14 of FIG. 1).

ANOTHER EMBODIMENT—FORWARD/REVERSE PLANETARY UNIT

Figure 16:
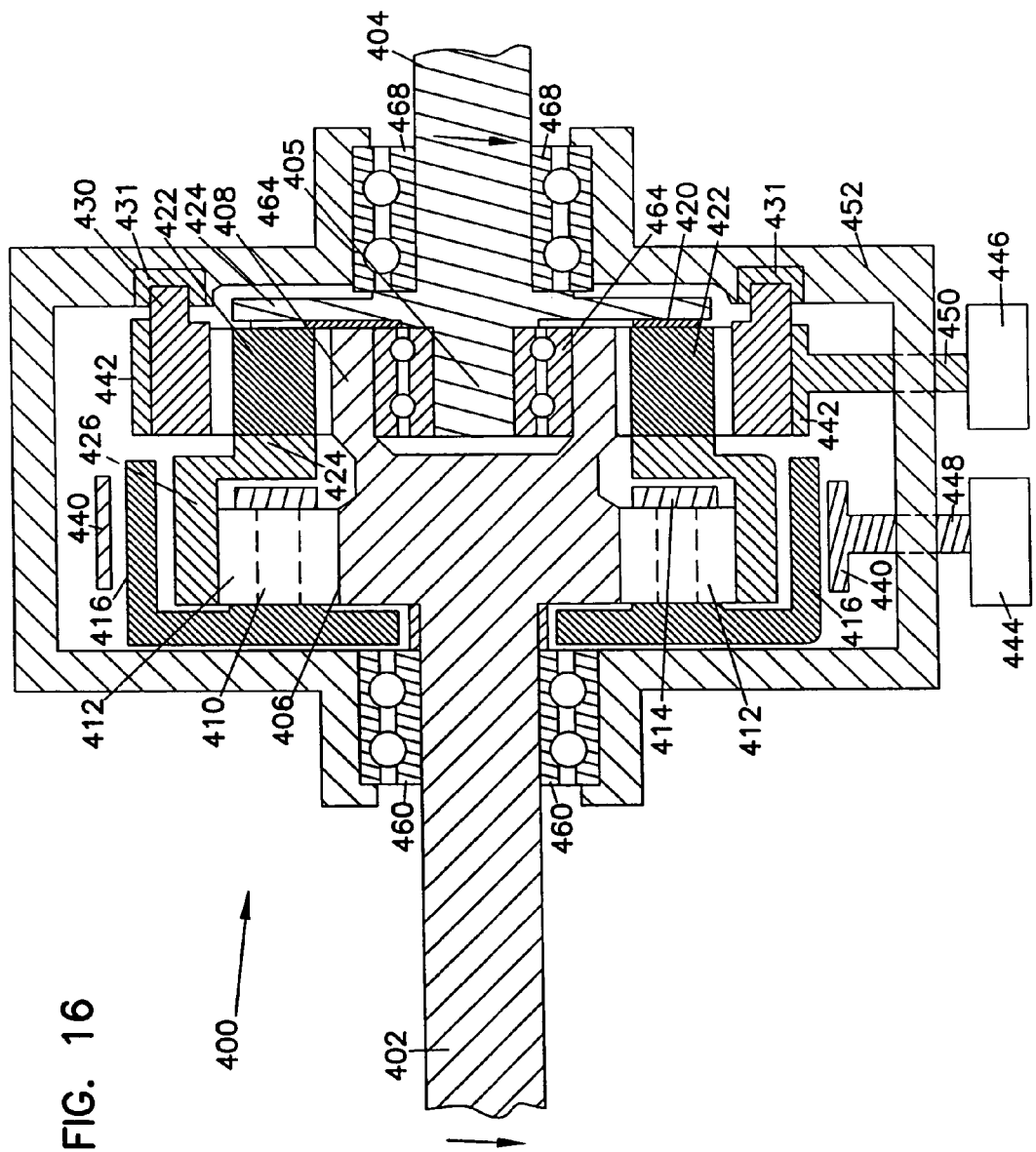
FIG. 16 is a sectional view of an alternative embodiment planetary gear system including a reverse unit shown in forward mode.
Figure 17:
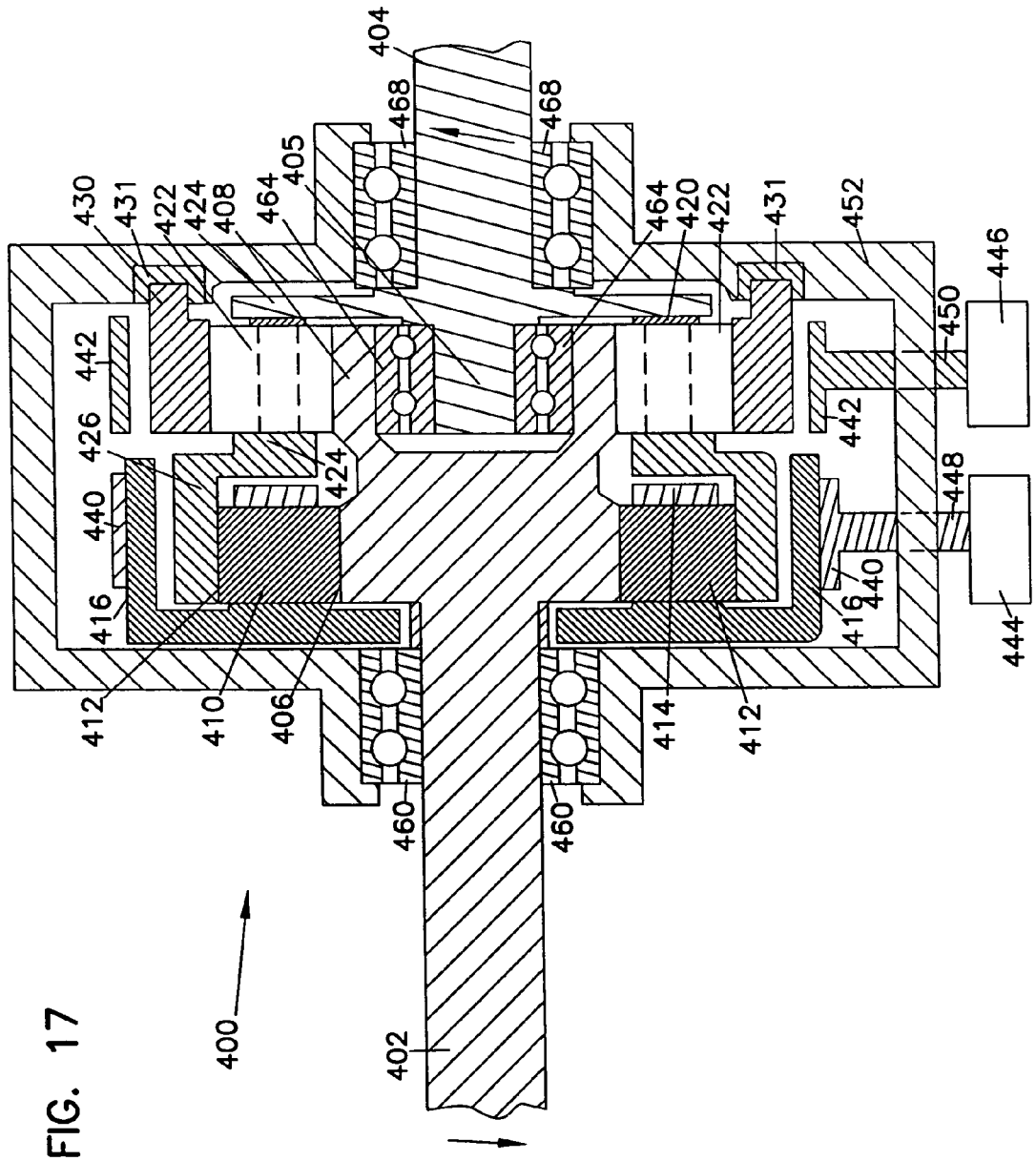
FIG. 17 is a sectional view of an alternative embodiment planetary gear system including a reverse unit shown in reverse mode.
Figure 18:
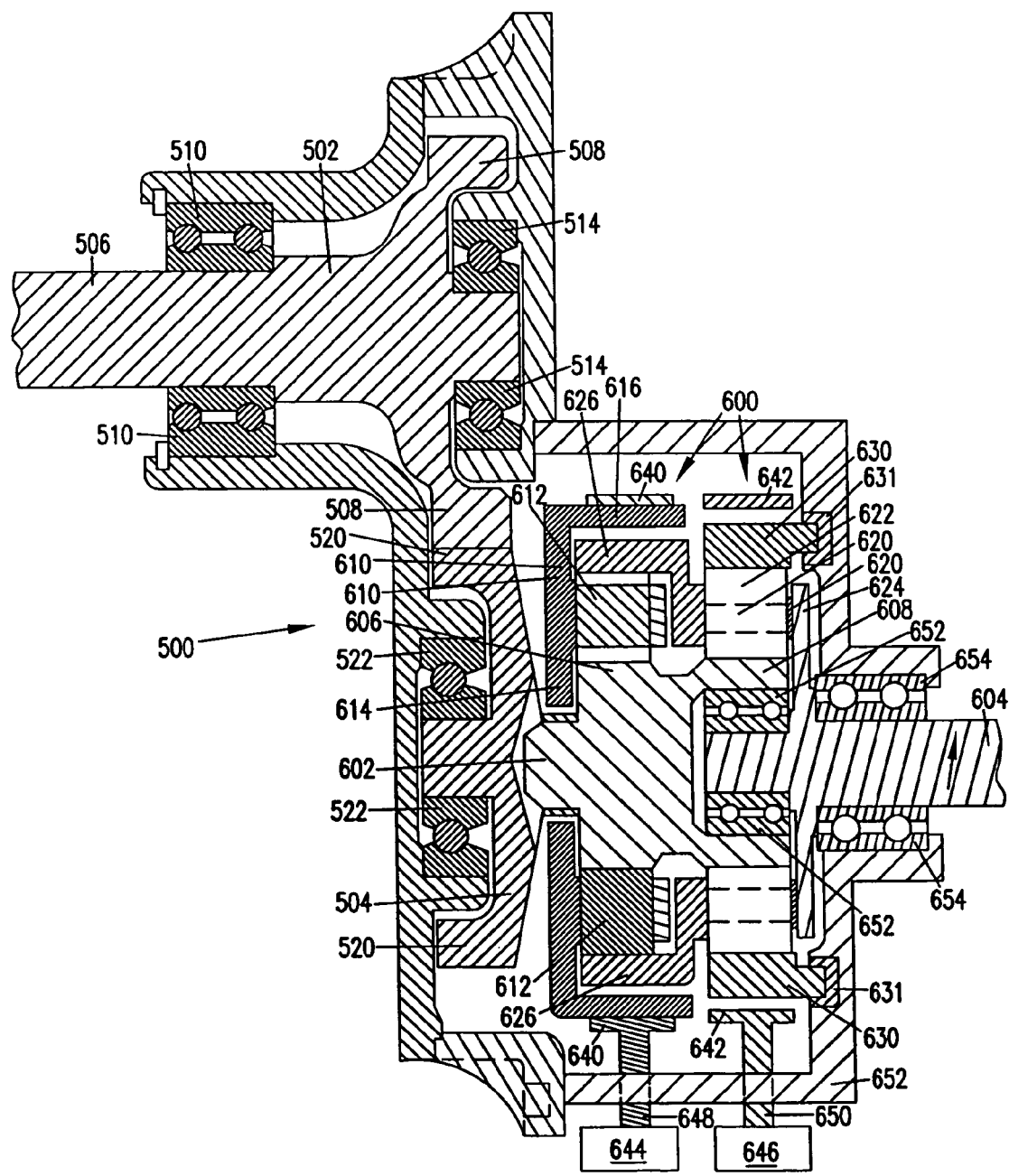
FIG. 18 is a sectional view of an alternative embodiment offset in combination with a planetary gear system including a reverse unit.

The present invention may also include a forward/reverse planetary unit, as shown in FIGS. 16–18, for driving the snowmobile in the forward and reverse directions. Such a forward/reverse unit could be used in conjunction with any of the embodiments described above.

A forward/reverse planetary unit is a planetary drive system that includes the ability to operate in a reverse mode in which the second shaft of the planetary drive system rotates in an opposite direction from the input shaft. FIGS. 16 and 17 are sectional views of one embodiment forward/reverse planetary unit 400. FIG. 16 illustrates forward/reverse planetary unit 400 in forward mode in which the second shaft 404 rotates in the same direction as the input shaft 402. FIG. 17 illustrates the forward/reverse planetary unit 400 in reverse mode in which the second shaft 404 rotates in the opposite direction of the input shaft 402.

First a discussion of the components of the forward/reverse planetary unit 400 will be described. Then a discussion of the forward and reverse modes will be provided in conjunction with FIGS. 16 and 17 respectively.

A forward/reverse planetary unit includes an input shaft that is driven either directly or indirectly by the engine drive shaft. An input shaft may be integral or separate, but connected to, whatever drives it. For example, an input shaft may be integral with the engine drive shaft, or it may be a separate shaft. Furthermore, an input shaft could be integral with a secondary clutch of a continuously variable transmission. Alternatively, an input shaft could be integral with the output of an offset (offset is discussed below). What is meant by "integral" is that the two parts that are integral are in actuality only one piece or one member. Forward/reverse planetary unit 400 includes input shaft 402.

A forward/reverse planetary unit also includes an output shaft. An output shaft either directly or indirectly drives the endless drive track of a snowmobile. An output shaft may be integral or separate, but connected to, whatever it drives. For example, an output shaft may be integral with a component of a continuously variable transmission in the situation in which the forward/reverse planetary unit is on the front end (drives the continuously variable transmission). Furthermore, an output shaft may be, but is not required to be, integral with the track shaft. Forward/reverse planetary unit 400 includes output shaft 404.

An output shaft may, but is not required to, include a weight bearing protrusion. In the embodiment shown in FIGS. 16 and 17, the output shaft 404 includes a weight bearing protrusion 405.

Input shaft 402 includes a first sun gear 406 and a second sun gear 408. Many different configurations and shapes and designs of sun gears may be used in this invention. First and second sun gears 406 and 408 are merely one embodiment.

A forward/reverse planetary unit includes a first planetary assembly and a second planetary assembly. A planetary assembly includes a plurality of planetary gears and a cage to support the plurality of planetary gears.

Forward/reverse planetary unit 400 includes first planetary assembly 410 that includes four planetary gears 412 (only two shown in cross sectional views), and cage 414. In this embodiment, cage 414 includes drum 416. Forward/reverse planetary unit 400 also includes second planetary assembly 420 that includes four planetary gears 422 (only two shown in cross sectional views), and cage 424. In this embodiment, cage 424 is integral with ring gear 426. Cage 424 is connected to the output shaft 404 so that rotation of the cage 424 results in rotation of the output shaft 404. Ring gear 426 meshes with the gear teeth on the planetary gears 412.

Forward/reverse planetary unit 400 also includes a second ring gear 430 that meshes with the gear teeth on planetary gears 422. In the embodiments shown in FIGS. 16 and 17, second ring gear 430 is supported by a guide 431 in the housing 452.

A forward/reverse planetary unit includes a first locking device and a second locking device. The definition of a locking device for purposes of this invention is any device or mechanism capable of releasably engaging either a cage or a ring gear to releasably prevent the cage or ring gear from rotating. A locking device may be a band or it may be some other mechanism. For example, a locking device may be an electric magnet that can be turned on and off to create a magnetic field capable of preventing rotational movement of a cage or ring gear.

The forward/reverse planetary unit 400 includes a first locking device that is first band 440, and a second locking device that is second band 442. First and second bands may be conventional reverse lock-up bands used in the automobile industry. First and second bands may be made of a steel band with a friction material along the surface that contacts the braked member.

A means for actuating the first and second locking devices may be provided. Means for actuating the first and second bands 440 and 442 may include electric solenoids, mechanical means including levers, and hydraulic systems. Means 444 and 446 are shown in FIGS. 16 and 17, with means 444 positioned to actuate first band 440, and means 446 positioned to actuate second band 442. The means 444 and 446 may result in movement of plungers 448 and 450 respectively wherein the plungers interact with the first and second bands 440 and 442 respectively. In the embodiment shown in FIGS. 16 and 17, forward/reverse planetary unit 400 includes a housing 452 through which the plungers 448 and 450 extend. Housing 452 may be sealed and contain lubricating oil such as discussed above with earlier embodiments.

Elements may be used to support the input shaft 402 and second shaft 404 while still allowing the supported elements to rotate. For example, these elements may be bearings or bushings. In the embodiment shown in FIGS. 16 and 17, these elements are double row bearings 460, 464 and 468.

A discussion of the forward/reverse planetary unit 400 in forward mode is now provided in conjunction with FIG. 16. In forward mode, second ring gear 430 is prevented from any substantial rotation. This is accomplished by actuating second band 442 to apply it to second ring gear 430. Furthermore, first band 440 is not actuated or applied to drum 416. The result is that planetary gears 422 "walk" along stationary second ring gear 430. Therefore, cage 424 rotates in the same direction as input shaft 402, and hence second shaft 404 also rotates in the same direction as input shaft 402.

A discussion of the forward/reverse planetary unit 400 in reverse mode is now provided in conjunction with FIG. 17. In reverse mode first band 440 is actuated to prevent any substantial rotational movement of drum 416 of cage 414. Second band 442 is not actuated or applied to second ring gear 430. The result is that planetary gears 412 drive ring gear 426 so that it rotates, and ring gear 426 is connected to the second shaft 404. Therefore, second shaft 404 rotates in reverse direction to input shaft 402.

It is noted that the gear reduction ratio of a forward/reverse planetary unit in forward mode may be the same or it may be different from the gear reduction ratio in reverse mode. The different ratios may be adjusted by adjusting the number of gear teeth on the first and second sun gears 406 and 408 as well as appropriate changes to the planetary and ring gears.

FURTHER EMBODIMENTS—OFFSET

Applicant also herein discloses an offset that may be used in conjunction with either a planetary gear system or with a forward/reverse planetary unit within a snowmobile. An offset is a mechanism that transfers drive power from one axis to another. An offset includes a first offset member and a second offset member. The first offset member and the second offset member both are capable of rotating in non-coaxial positions. An offset may include, but is not required to include, a gear reduction ratio. That is, the first and second offset members may rotate at the same rotational speed or at different rotational speeds.

First offset member includes gear teeth that are collectively referred to as first offset gear. Likewise, second offset member includes gear teeth collectively referred to as second offset gear. A first offset gear is any form of gear capable of driving another gear. A second offset gear is a gear capable of being driven by a first offset gear. The second offset member may be driven by direct contact between the first offset gear and the second offset gear. Alternatively, there may be an intermediate member or members such as a third member (not shown) including a third gear between the first and second offset members.

FIG. 18 is a sectional view of one embodiment of an offset combined with a forward/reverse unit, namely offset and forward/reverse planetary unit 500 (referred to hereinafter as unit 500). Unit 500 includes first offset member 502 and second offset member 504. First offset member 502 includes a shaft 506 with a first offset gear 508.

Elements may be used to support the first offset member while still allowing the first offset member to rotate. For example, these elements may be bearings or bushings. In one embodiment, the first offset member 506 is rotationally supported by double row bearing 510, and single row bearing 514.

Second offset member 504 includes second offset gear 520 that meshes with first offset gear 508 of the first offset member 502. Second offset member 504 is rotatably supported by one or more elements. For example, these elements may be bearings or bushings. In one embodiment, the element supporting second offset member 504 may be single row bearing 522.

Second offset member 504 is integral with input shaft 602 of forward/reverse planetary unit 600. Note that forward/reverse planetary unit 600 is only shown in the Figures in reverse mode. However, forward mode is also possible and is easily surmised from a review of FIG. 16.

Input shaft 602 includes a first sun gear 606 and a second sun gear 608. Many different configurations and shapes and designs of sun gears may be used in this invention. First and second sun gears 606 and 608 are merely one embodiment.

A forward/reverse planetary unit includes a first planetary assembly and a second planetary assembly. A planetary assembly includes a plurality of planetary gears and a cage to support the plurality of planetary gears.

Forward/reverse planetary unit 600 includes first planetary assembly 610 that includes four planetary gears 612 (only two shown in cross sectional views), and cage 614. In this embodiment, cage 614 includes drum 616. Note that a cage, by definition is not required to include a drum. Rather, a cage with a drum is merely one embodiment of a cage. Forward/reverse planetary unit 600 also includes second planetary assembly 620 that includes four planetary gears 622 (only two shown in cross sectional views), and cage 624. In this embodiment, cage 624 is integral with ring gear 626. Cage 624 is connected to the output shaft 604 so that rotation of the cage 624 results in rotation of the output shaft 604. Ring gear 626 meshes with the gear teeth on the planetary gears 612.

Forward/reverse planetary unit 600 also includes a second ring gear 630 that meshes with the gear teeth on planetary gears 622. In the embodiment shown in FIG. 18, second ring gear 630 is supported by guide 631 in housing 652.

A forward/reverse planetary unit includes a first locking device and a second locking device. The definition of a locking device for purposes of this invention is any mechanism capable of releasably engaging either a cage or a ring gear to releasably prevent the cage or ring gear from rotating.

The forward/reverse planetary unit 600 includes a first locking device that is first band 640, and a second locking device that is second band 642. First and second bands may be conventional reverse lock-up bands used in the automobile industry.

A means for actuating the first and second locking devices may be provided. Means for actuating the first and second bands 640 and 642 may include electric solenoids, mechanical means including levers, and hydraulic systems. Means 644 and 446 are shown in FIG. 18 with means 644 positioned to actuate first band 640, and means 646 positioned to actuate second band 642. The means 644 and 646 may result in movement of plungers 648 and 650 respectively wherein the plungers interact with the first and second bands 640 and 642 respectively. In the embodiment shown in FIG. 18, unit 500 includes a housing 652 through which the plungers 648 and 650 extend. Housing 652 may be sealed and contain lubricating oil as discussed above with earlier embodiments.

Elements may be used to support the second shaft 604 while still allowing the second shaft 604 to rotate. For example, these elements may be bearings or bushings. In one embodiment these elements are double row bearings 652 and 654.

The unit 500 may be utilized in the drive train of a snowmobile in such a way that the first offset member is connected to the secondary clutch of a continuously variable transmission which in turn is driven by an engine drive shaft. For example, one could replace reduction drive 19 in FIG. 3 with unit 500 of FIG. 18. In such a case the first offset member 506 would be connected to, or integral with, the secondary clutch and the second shaft 604 would be connected to, or integral with, the track shaft. The secondary clutch would drive the first offset member 506 and the second shaft 604 would drive the endless drive track of the snowmobile.

An offset combined with a planetary gear system is also disclosed here. One embodiment offset and planetary gear system is shown in sectional view in FIG. 19. Specifically, offset and planetary gear system 700 (hereinafter referred to as unit 700) is provided. Unit 700 includes a first offset member 702 and a second offset member 704. First offset gear 706 of first offset member meshes with second offset gear 708 of second offset member 704 so that rotation of first offset member causes rotation of second offset member. As with the offset discussed above in relation to FIG. 18, there may be, but does not have to be, a gear reduction ratio between the first offset member and the second offset member.

Figure 19:
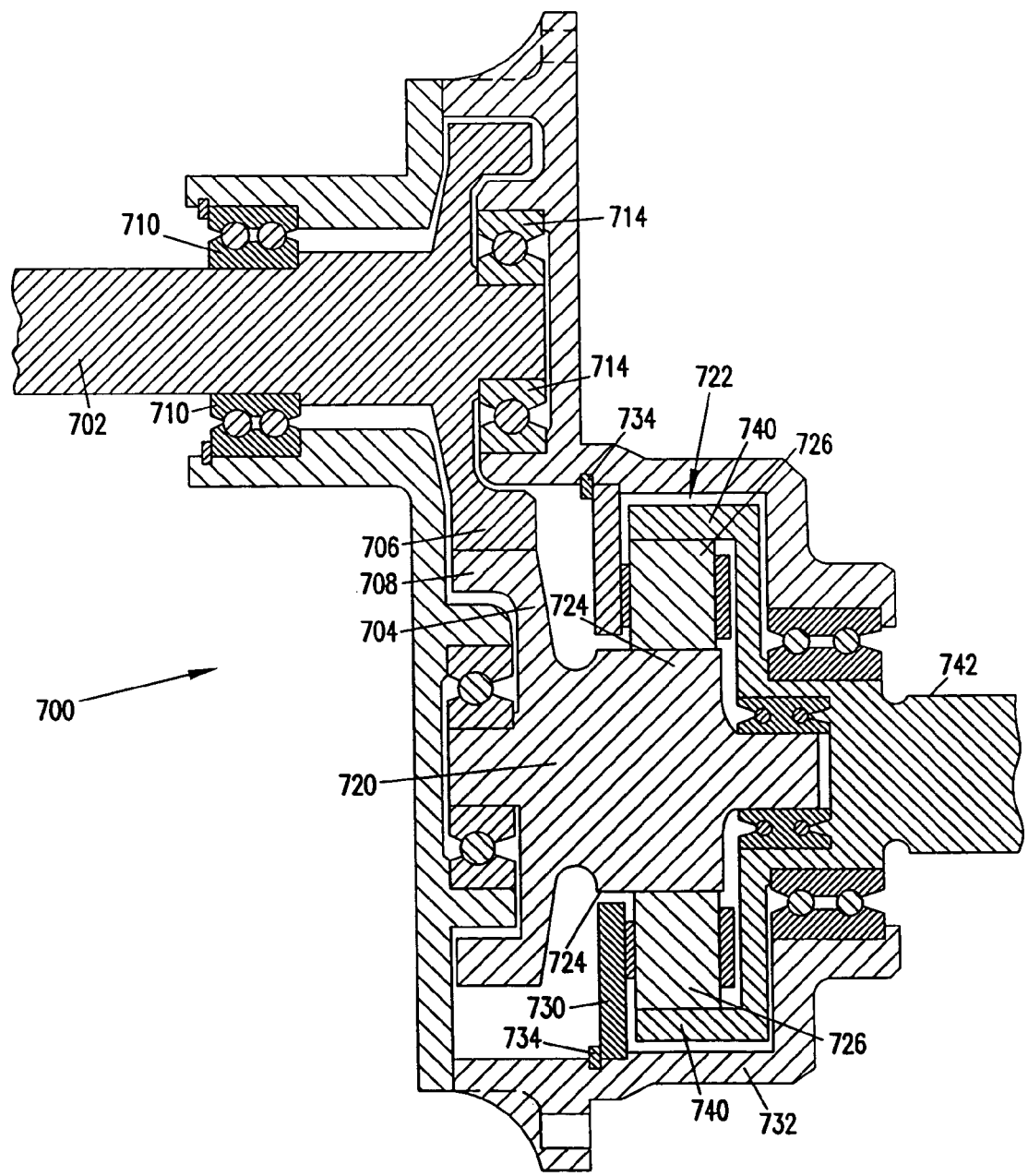
FIG. 19 is a sectional view of an alternative embodiment offset in combination with a planetary gear system.

Elements may be used to support the first offset member while still allowing the first offset member to rotate. For example, these elements may be bearings or bushings. In the embodiment of FIG. 19, first offset member 702 is rotationally supported by double row bearing 710 and single row bearing 714.

Second offset member 704 is integral with input shaft 720 of planetary gear system 722 so that rotation of second offset member 704 results in rotation of input shaft 720. Input shaft 720 includes sun gear 724 that drives planetary gears 726 by being meshed with such.

Cage 730 is fixedly secured to housing 732 by clip 734 so that cage 730 cannot rotate relative to housing 732. Ring gear 740 is integral with second shaft 742 so that rotation of ring gear 740 causes rotation of second shaft 742. Ring gear 740 is driven by planetary gears 726 by being meshed with such.

Figure 2:
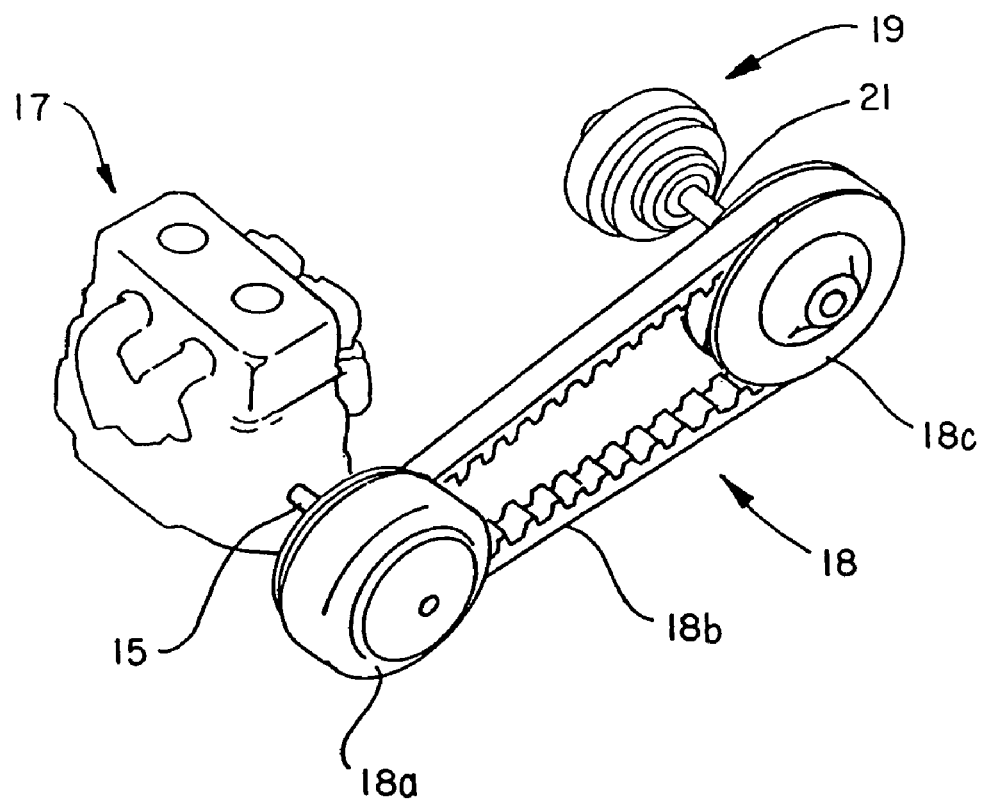
FIG. 2 shows a perspective view of the snowmobile engine and drive system of the present invention.
Figure 3:
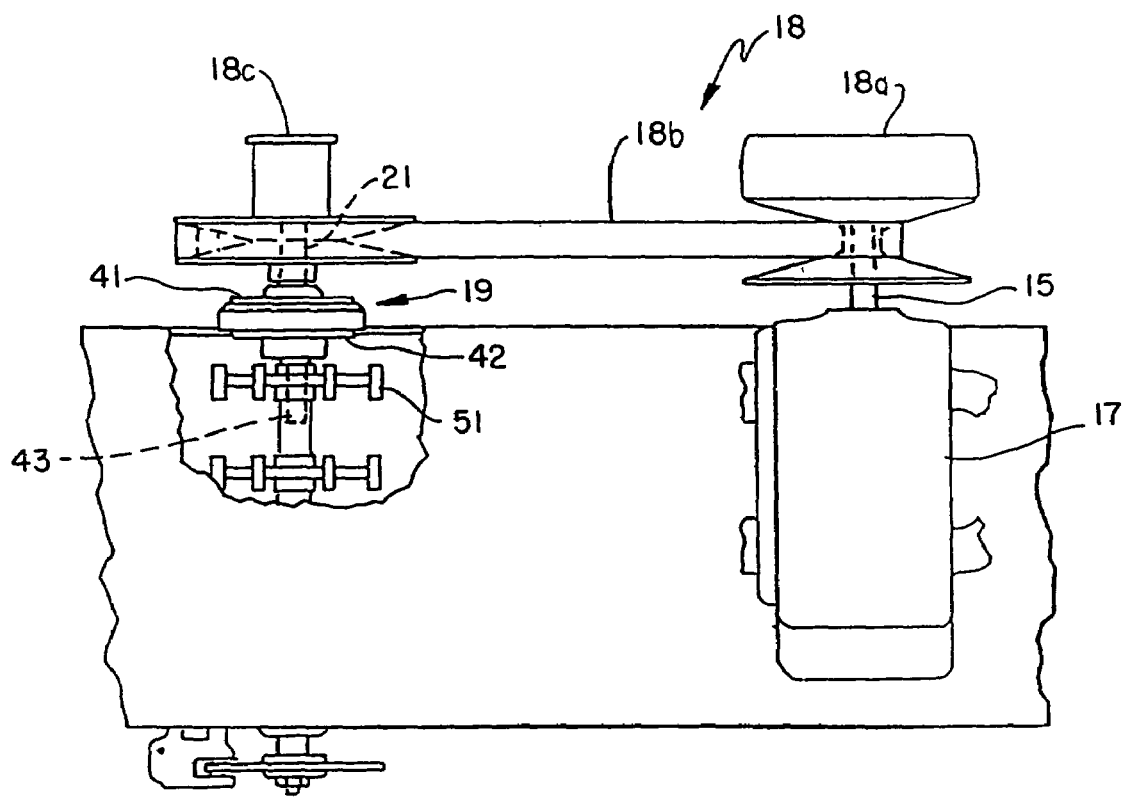
FIG. 3 shows a plan view of a chassis including an engine, clutch system and the planetary drive system of the present invention.
Figure 4:
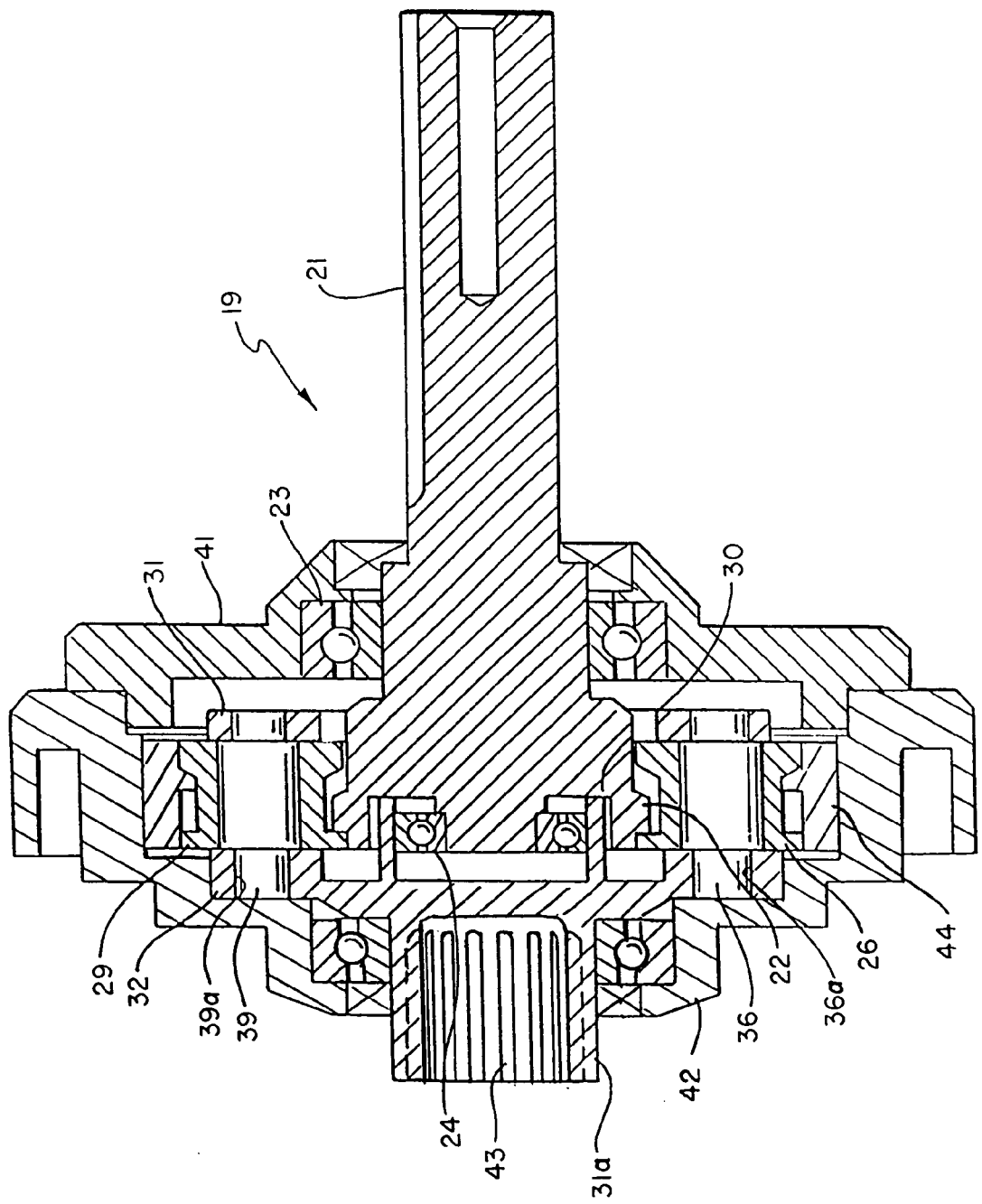
FIG. 4 shows a sectional view of the planetary drive system of the present invention.
Figure 5:
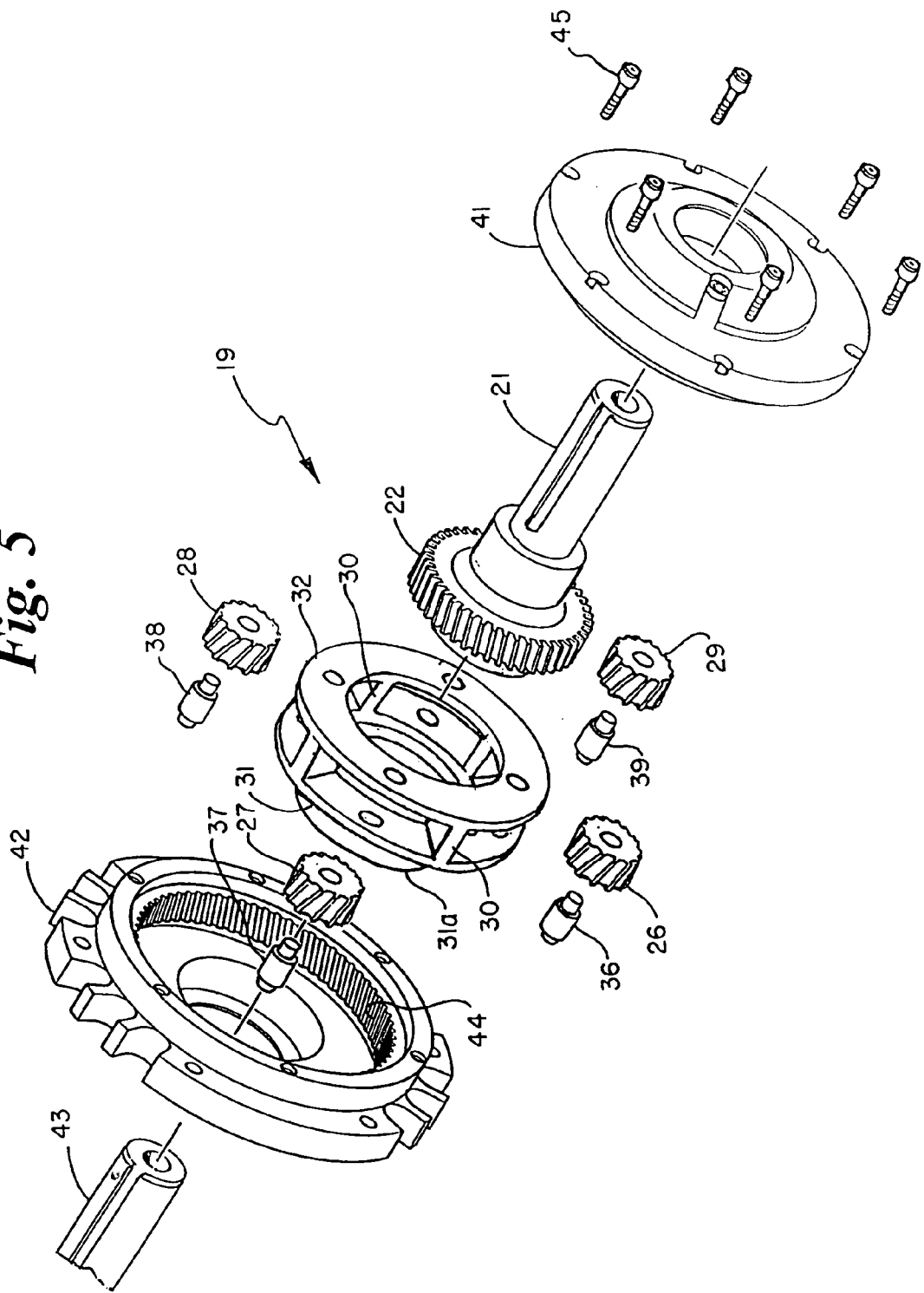
FIG. 5 shows an exploded view of the planetary drive system of the present invention.
Figure 6:
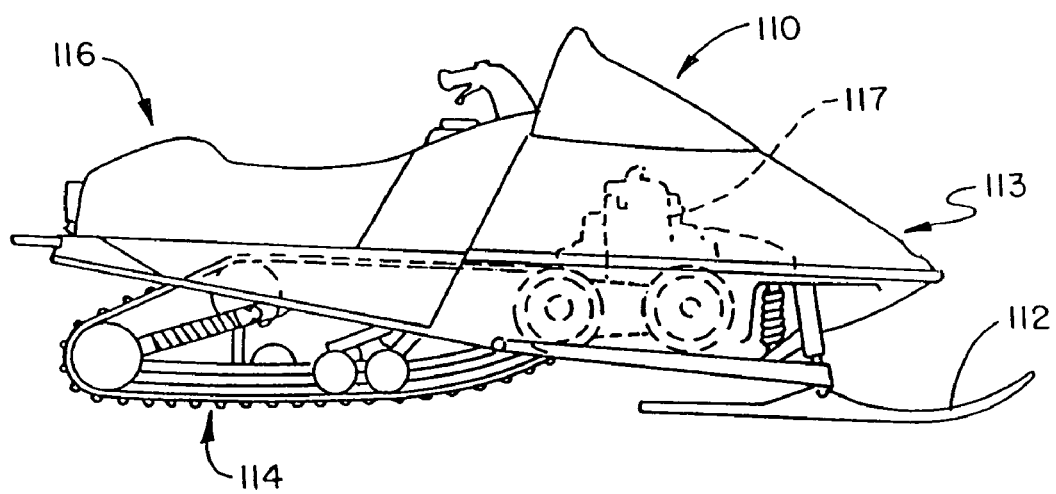
FIG. 6 shows an alternative embodiment of the present snowmobile.
Figure 7:
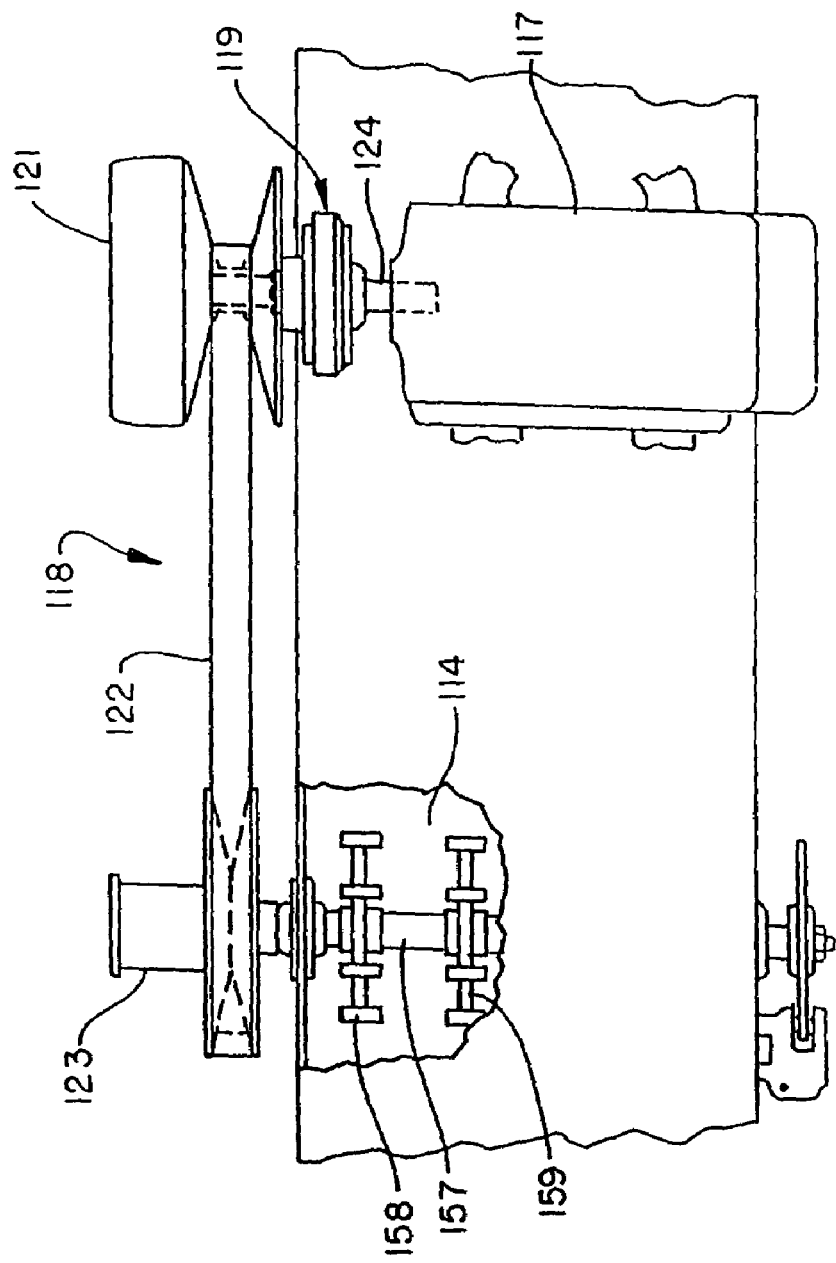
FIG. 7 shows a plan view of a chassis of an alternative embodiment of the present invention including an engine and the reduced rpm clutch system.
Figure 8:
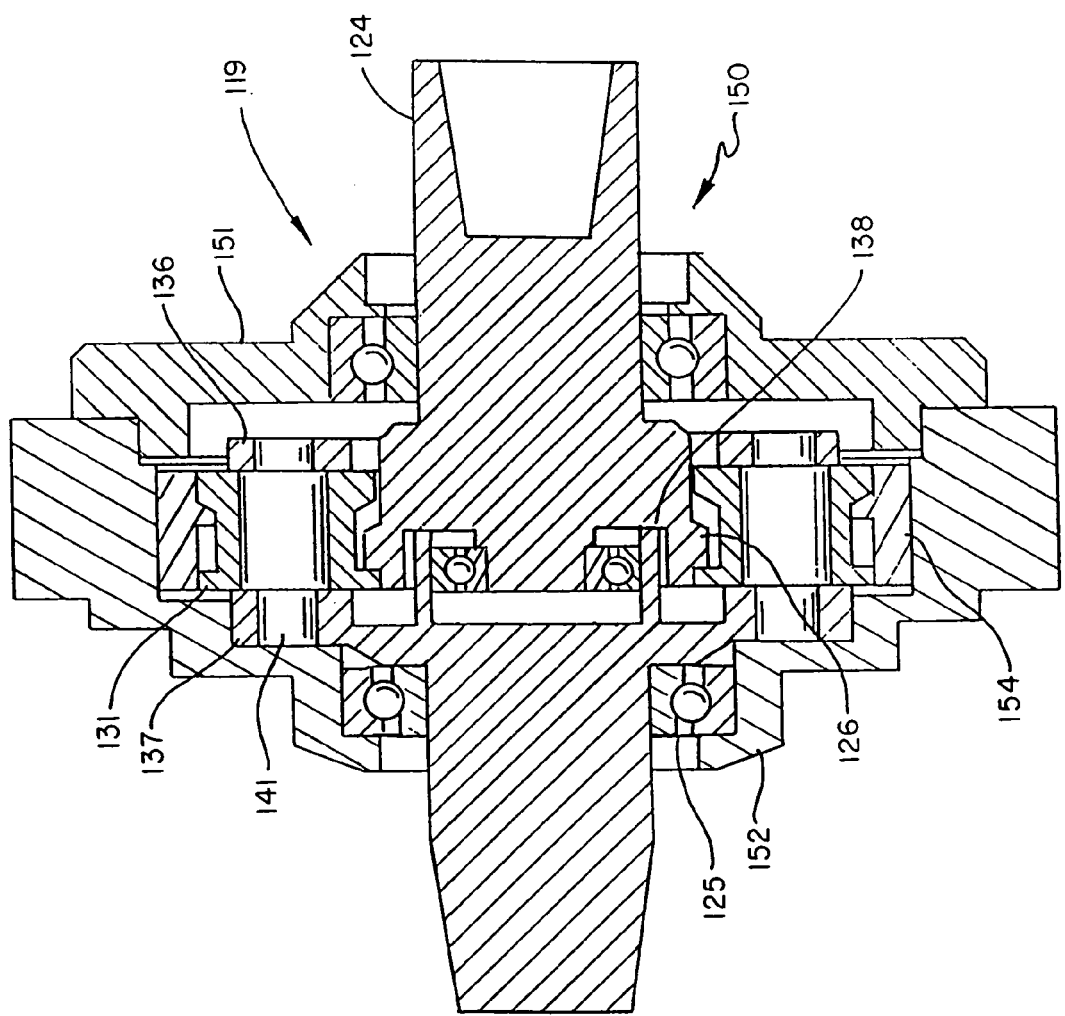
FIG. 8 shows a sectional view of the planetary gear reduction system of an alternative embodiment of the present invention.

Unit 700 would be utilized in the drive train of a snowmobile in the same location as unit 19 in FIGS. 2 and 3. That is, offset member 702 is driven by the secondary clutch of a continuously variable transmission, that is driven by an engine drive shaft. Output shaft 742 drives an endless drive track, through for example a track shaft. Output shaft 742 may be integral with the track shaft.

The above specification, examples and data provide a complete description of the device and use of the invention. Since many embodiments of the invention can be made without departing from the spirit and scope of the invention, the invention resides in the claims hereinafter appended.

What is claimed is:

1. A snowmobile comprising:
   (a) a continuously variable transmission having a driven pulley;
   (b) a snowmobile track drive sprocket;
   (c) a forwardly mounted engine having a drive shaft coupled to the driven pulley by means of a drive belt;
   (d) a rearwardly extending tunnel comprising a top panel and two side panels;
   (e) a first shaft including a first sun gear and a second sun gear adjacent the first sun gear, the driven pulley being coupled to the first shaft;
   (f) a second shaft, the snowmobile drive sprocket being coupled to the second shaft;
   (g) a first planetary assembly including a plurality of first planetary gears and a first cage supporting the plurality of first planetary gears, wherein the plurality of first planetary gears is driven by the first sun gear;
   (h) a second planetary assembly including a plurality of second planetary gears and a second cage supporting the plurality of second planetary gears, wherein the plurality of second planetary gears are driven by the second sun gear;
   (i) a first ring gear connected to the second shaft wherein rotation of the first ring gear at a first rate of rotation causes rotation of the second shaft at the first rate of rotation, and wherein the first ring gear is capable of being driven by the plurality of first planetary gears;
   (j) a second ring gear wherein the second ring gear meshes with the plurality of second planetary gears;
   (k) a first locking device engagable with the first cage to releasably lock the first cage in a fixed rotated position; and
   (l) a second locking device engagable with the second ring gear to releasably lock the second ring gear in a fixed rotated position; and
   (m) a housing mounted to one of the two side panels, the housing at least partially encasing the first and second sun gears and first and second planetary assemblies.

2. The snowmobile of claim 1 wherein the first second cage is coupled between the first ring gear and the second shaft.

3. The snowmobile of claim 1, wherein the first and second shafts are coaxial, and wherein at least one of the first and second shafts includes a weight-bearing protrusion projecting within an end of the other of the first and second shafts, a bearing being positioned on the weight-bearing protrusion between the first and second shafts.

4. The snowmobile of claim 1, wherein the one of the two side panels to which the housing is mounted at least partially encases the first and second sun gears and the first and second planetary assemblies.

5. A snowmobile comprising:
   (a) a frame including a tunnel;
   (b) an engine secured to the frame forward of the tunnel, the engine having a drive shaft extending therefrom;
   (c) a track coupled to the tunnel;
   (d) a track shaft coupled to the tunnel and to the track for driving the track;
   (e) a continuously variable transmission coupled between the drive shaft and the track shaft; and
   (f) a planetary gear assembly including a housing, an input shaft, an output shaft, a plurality of planetary gears, and a ring gear; the input shaft including a sun gear, the sun gear being coupled to the plurality of planetary gears which are in turn coupled to the ring gear, the planetary gears being held at their axes by a cage, the cage and ring gear each being selectively fixed relative to the housing; wherein the planetary gear assembly is coupled between one of (i) the drive shaft and the continuously variable transmission and (ii) the continuously variable transmission and the track shaft on the same side of the tunnel as the continuously variable transmission.

6. The snowmobile of claim 5, wherein the continuously variable transmission includes a driven pulley coupled to the drive shaft with a belt, the driven pulley being secured to a driven shaft; and wherein the planetary gear assembly is coupled to the driven shaft and to the track shaft.

7. The snowmobile of claim 6, wherein the input shaft includes an input gear extending outwardly from one end thereof, the snowmobile further comprising an offsetting gear coupling the driven shaft to the input gear.

8. The snowmobile of claim 1, wherein the input and output shafts are coaxial, and wherein at least one of the input and output shafts includes a weight-bearing protrusion projecting within an end of the other of the first and second shafts, a bearing being positioned on the weight-bearing protrusion between the first and second shafts.

9. A snowmobile comprising:
   (a) a frame including a tunnel;
   (b) an engine secured to the frame forward of the tunnel, the engine having a drive shaft extending therefrom;
   (c) a track coupled to the tunnel;
   (d) a track shaft coupled to the tunnel and to the track for driving the track;
   (e) a continuously variable transmission coupled between the drive shaft and the track shaft, the continuously variable transmission including a driven pulley coupled to the drive shaft by a belt; and
   (f) a planetary gear assembly including a housing, an input shaft with a sun gear, an output shaft, a plurality of planetary gears, and a ring gear coupled together; the planetary gears being held at their axes by a cage, the cage and ring gear each being selectively fixed relative to the housing; wherein the planetary gear assembly is coupled between the driven pulley and the track shaft on the same side of the tunnel as the driven pulley.

10. The snowmobile of claim 9, wherein the input and output shafts are coaxial, and wherein at least one of the input and output shafts includes a weight-bearing protrusion projecting within an end of the other of the first and second shafts, a bearing being positioned on the weight-bearing protrusion between the first and second shafts.

* * * * *